US012475384B2

(12) United States Patent
Gu et al.

(10) Patent No.: US 12,475,384 B2
(45) Date of Patent: Nov. 18, 2025

(54) SELF-SUPERVISED VISUAL-RELATIONSHIP PROBING

(71) Applicant: Adobe Inc., San Jose, CA (US)

(72) Inventors: Jiuxiang Gu, Greenbelt, MD (US); Vlad Ion Morariu, Potomac, MD (US); Tong Sun, San Ramon, CA (US); Jason wen yong Kuen, Santa Clara, CA (US); Handong Zhao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 905 days.

(21) Appl. No.: 17/093,185

(22) Filed: Nov. 9, 2020

(65) Prior Publication Data

US 2022/0147838 A1 May 12, 2022

(51) Int. Cl.

*G06N 5/022* (2023.01)
*G06N 3/08* (2023.01)
*G06N 7/00* (2023.01)
*G06T 7/90* (2017.01)

(52) U.S. Cl.

CPC ............... *G06N 5/022* (2013.01); *G06N 3/08* (2013.01); *G06N 7/00* (2013.01); *G06T 7/90* (2017.01)

(58) Field of Classification Search

CPC . G06N 5/022; G06N 3/08; G06N 7/00; G06T 7/90

See application file for complete search history.

(56) References Cited

U.S. PATENT DOCUMENTS

| | | | | |
|---|---|---|---|---|
| 2017/0132526 | A1* | 5/2017 | Cohen | G06N 20/00 |
| 2018/0181592 | A1* | 6/2018 | Chen | G06N 3/08 |
| 2020/0160178 | A1* | 5/2020 | Kar | G06N 20/20 |
| 2021/0081728 | A1* | 3/2021 | Lai | G06V 10/82 |
| 2021/0275918 | A1* | 9/2021 | Devaranjan | G06V 20/20 |
| 2021/0374547 | A1* | 12/2021 | Wang | G06N 3/047 |
| 2022/0014807 | A1* | 1/2022 | Lin | G06V 20/635 |

OTHER PUBLICATIONS

Liu et al.("Graph Structured Network for Image-Text Matching" , Apr. 1, 2020) (Year: 2020).*

Tan et al.("LXMERT: Learning Cross-Modality Encoder Representations from Transformers", Dec. 3, 2019) (Year: 2019).*

(Continued)

*Primary Examiner* — Jason B Dunham
*Assistant Examiner* — Huma Waseem
(74) *Attorney, Agent, or Firm* — Kilpatrick Townsend & Stockton LLP

(57) ABSTRACT

Methods and systems disclosed herein relate generally to systems and methods for generating visual relationship graphs that identify relationships between objects depicted in an image. A vision-language application uses transformer encoders to generate a graph structure, in which the graph structure represents a dependency between a first region and a second region of an image. The dependency indicates that a contextual representation of the first region was derived, at least in part, by processing the second region. The contextual representation identifies a predicted identity of an image object depicted in the first region. The predicted identity is determined at least in part by identifying a relationship between the first region and other data objects associated with various modalities.

20 Claims, 13 Drawing Sheets

(56) References Cited

OTHER PUBLICATIONS

ICCV ("Scene Graph Representation and Learning", Oct. 28, 2019) (Year: 2019).*
Koner et al. ("Relation Transformer Network" , Apr. 13, 2020) (Year: 2020).*
Tripathi et al.("Triplet-Aware Scene Graph Embeddings" , Sep. 19, 2019) (Year: 2019).*
Anderson et al., Bottom-Up and Top-Down Attention for Image Captioning and Visual Question Answering, 2018 IEEE/CVF Conference on Computer Vision and Pattern Recognition, Jun. 18-23, 2018, pp. 6077-6086.
Antol et al., VQA: Visual Question Answering, Proceedings of the IEEE International Conference on Computer Vision, 2015, pp. 2425-2433.
Ba et al., Layer Normalization, arXiv:1607.06450, Available Online at: https://arxiv.org/abs/1607.06450, 2016, 14 pages.
Chen et al., A Simple Framework for Contrastive Learning of Visual Representations, Proceedings of the 37th International Conference on Machine Learning, 2020, 20 pages.
Chen et al., Microsoft COCO Captions: Data Collection and Evaluation Server, arXiv:1504.00325, 2015, 7 pages.
Chen et al., Scene Graph Prediction with Limited Labels, 2019 International Conference on Computer Vision, 2019, 11 pages.
Chen et al., UNITER: Learning Universal Image-text Representations, arXiv:1909.11740 [cs.CV], Available Online at: https://arxiv.org/abs/1909.11740, 2019, 26 pages.
Clark et al., What Does BERT Look At? An Analysis of BERT's Attention, In BlackBoxNLP@ACL, 2019, 11 pages.
Coenen et al., Visualizing and Measuring the Geometry of Bert, 33rd Conference on Neural Information Processing Systems (NeurIPS 2019), 2019, 16 pages.
Dai, Transformer-XL: Attentive Language Models Beyond a Fixed-length Context, Annual Meeting of the Association for Computational Linguistics, 2019, 20 pages.
Devlin et al., BERT: Pre-Training of Deep Bidirectional Transformers for Language Understanding, In Proceedings of the 2019 Conference of the North American Chapter of the Association for Computational Linguistics: Human Language Technologies, vol. 1, May 24, 2019, pp. 4171-4186.
Dornadula et al., Visual Relationships as Functions: Enabling Few-shot Scene Graph Prediction, International Conference on Computer Vision Workshop (ICCVW), 2019, 10 pages.
Garcia et al., Few-Shot Learning with Graph Neural Networks, International Conference on Learning Representations, 2018, 13 pages.
Girshick, Fast R-CNN, In Proceedings of the IEEE International Conference on Computer Vision, 2015, pp. 1440-1448.
Gu et al., Scene Graph Generation with External Knowledge and Image Reconstruction, Conference on Computer Vision and Pattern Recognition, 2019, 10 pages.
Gu et al., Unpaired Image Captioning via Scene Graph Alignments, International Conference on Computer Vision, Available Online at: https://arxiv.org/abs/1903.10658, 2019, 10 pages.
He et al., Deep Residual Learning for Image Recognition, IEEE Conference on Computer Vision and Pattern Recognition (CVPR), 2016, pp. 770-778.
Hewitt et al., A Structural Probe for Finding Syntax in Word Representations, North American Chapter of the Association for Computational Linguistics, 2019, 10 pages.
Hu et al., Relation Networks for Object Detection, Computer Vision and Pattern Recognition, 2018, 10 pages.
Hudson et al., GQA: A New Dataset for Real-world Visual Reasoning and Compositional Question Answering, Conference on Computer Vision and Pattern Recognition, Available Online at: https://arxiv.org/abs/1902.09506, 2019, 18 pages.
Johnson et al., Image Retrieval Using Scene Graphs, IEEE Conference on Computer Vision and Pattern Recognition (CVPR), 2015, 11 pages.
Johnson et al., Inferring and Executing Programs for Visual Reasoning, International Conference on Computer Vision, 2017, 10 pages.
Karpathy et al., Deep Visual-Semantic Alignments for Generating Image Descriptions, Proceedings of the IEEE Conference on Computer Vision and Pattern Recognition, 2015, 10 pages.
Kingma et al., ADAM: A Method for Stochastic Optimization, In International Conference on Learning Representations, 2015, pp. 1-15.
Krishna et al., Visual Genome: Connecting Language and Vision Using Crowdsourced Dense Image Annotations, International Journal of Computer Vision, vol. 123, 2017, pp. 32-73.
Levine et al., SenseBERT: Driving Some Sense into BERT, 2020 Association for Computational Linguistics, 2020, 12 pages.
Li et al., Oscar: Object-semantics Aligned Pre-training for Vision-language Tasks, arXiv preprint arXiv:2004.06165, 2020, 21 pages.
Li et al., Unicoder-VL: A Universal Encoder for Vision and Language by Cross-modal Pre-training, Association for the Advancement of Artificial Intelligence 2020, 2020, 8 pages.
Li et al., VisualBERT: A Simple and Performant Baseline for Vision and Language, arXiv:1908.03557, Available Online at: https://arxiv.org/abs/1908.03557, 2019, 14 pages.
Lin et al., Microsoft COCO: Common Objects in Context, European Conference on Computer Vision, Feb. 21, 2015, pp. 740-755.
Lu et al., ViLBERT: Pretraining Task-agnostic Visiolinguistic Representations for Vision-and-language Tasks, 2019 Conference on Neural Information Processing Systems, 2019, 11 pages.
Lu et al., Visual Relationship Detection with Language Priors, European Conference on Computer Vision 2016, 2016, 19 pages.
Macleod et al., Understanding Blind People's Experiences with Computer-Generated Captions of Social Media Images, CHI 2017, Available Online at: https://www.microsoft.com/enus/research/uploads/prod/2016/10/captions_chi2017.pdf, May 6-11, 2017, 12 pages.
Ng et al., Facebook FAIR's WMT19 News Translation Task Submission, arXiv preprint arXiv:1907.06616, Available Online at: https://arxiv.org/abs/1907.06616, 2019, 7 pages.
Norcliffe-Brown et al., Learning Conditioned Graph Structures for Interpretable Visual Question Answering, 32nd Conference on Neural Information Processing Systems (NIPS 2018), 2018, 13 pages.
Oord et al., Representation Learning with Contrastive Predictive Coding, arXiv preprint arXiv:1807.03748, 2018, 13 pages.
Ordonez et al., Im2Text: Describing Images Using 1 Million Captioned Photographs, Neural Information Processing Systems, 2011, 9 pages.
Ott et al., fairseq: A Fast, Extensible Toolkit for Sequence Modeling, Proceedings of the 2019 Conference of the North American Chapter of the Association for Computational Linguistics (Demonstrations), 2019, 6 pages.
Pruthi et al., Learning to Deceive with Attention-Based Explanations, arXiv preprint arXiv:1909.07913, 2019, 9 pages.
Qi et al., Stanza: A Python Natural Language Processing Toolkit for Many Human Languages, Association for Computational Linguistics (ACL), 2020, 8 pages.
Radford et al., Improving Language Understanding by Generative Pre-training, Available Online at: https://s3-us-west-2.amazonaws.com/openai-assets/research-covers/language-unsupervised/language_understanding_paper.pdf, 2018, 12 pages.
Ren et al., Faster R-CNN: Towards Real-Time Object Detection with Region Proposal Networks, Institute of Electrical and Electronics Engineers Transactions on Pattern Analysis and Machine Intelligence, vol. 39, No. 6, Jun. 4, 2015, 9 pages.
Rennie et al., Self-critical Sequence Training for Image Captioning, Conference on Computer Vision and Pattern Recognition, Available Online at: https://openaccess.thecvf.com/content_cvpr_2017/papers/Rennie_Self-Critical_Sequence_Training_CVPR_2017_paper.pdf, 2017, 17 pages.
Santoro et al., A Simple Neural Network Module for Relational Reasoning, Conference on Neural Information Processing Systems, 2017, 16 pages.
Sharma et al., Conceptual Captions: A Cleaned, Hypernymed, Image Alt-text Dataset for Automatic Image Captioning, Proceed-

(56) References Cited

OTHER PUBLICATIONS ings of the 56th Annual Meeting of the Association for Computational Linguistics, vol. 1, 2018, pp. 2556-2565.
Su et al., VL-BERT: Pre-training of Generic Visual-linguistic Representations, The International Conference on Learning Representations (ICLR) 2020, 2020, 16 pages.
Suhr et al., A Corpus for Reasoning About Natural Language Grounded in Photographs, Association for Computational Linguistics (ACL), 2019, 22 pages.
Sun et al., Videobert: A Joint Model for Video and Language Representation Learning, International Conference on Computer Vision, 2019, 10 pages.
Tan et al., LXMERT: Learning Cross-modality, Proceedings of the 2019 Conference on Empirical Methods in Natural Language Processing and the 9th International Joint Conference on Natural Language Processing, Nov. 3-7, 2019, pp. 5100-5111.
Teney et al., Graph-structured Representations for Visual Question Answering, Conference on Computer Vision and Pattern Recognition, 2017, 17 pages.
Tenney et al., What Do You Learn from Context? Probing for Sentence Structure in Contextualized Word Representations, International Conference on Learning Representations (ICLR), 2019, 17 pages.
Vaswani et al., Attention is All You Need, Conference on Neural Information Processing Systems, 2017, 15 pages.
Voita et al., Analyzing Multi-Head Self-attention: Specialized Heads Do the Heavy Lifting, the Rest Can Be Pruned, Proceedings of the 57th Annual Meeting of the Association for Computational Linguistics, Jul. 2019, pp. 5797-5808.
Wang et al., Neighbourhood Watch: Referring Expression Comprehension via Language-guided Graph Attention Networks, Conference on Computer Vision and Pattern Recognition, 2019, 9 pages.
Wu et al., Google's Neural Machine Translation System: Bridging the Gap between Human and Machine Translation, arXiv preprint arXiv:1609.08144, Available online at: https://arxiv.org/pdf/1609.08144.pdf, Oct. 8, 2016, pp. 1-23.
Wu et al., Unsupervised Feature Learning via Non-Parametric Instance Discrimination, Conference on Computer Vision and Pattern Recognition, 2018, 10 pages.
Yang et al., Auto-encoding Scene Graphs for Image Captioning, Conference on Computer Vision and Pattern Recognition, 2019, 15 pages.
Yang et al., XLNet: Generalized Autoregressive Pretraining for Language Understanding, Conference on Neural Information Processing Systems, 2019, 18 pages.
Yu et al., Visual Relationship Detection with Internal and External Linguistic Knowledge Distillation, International Conference on Computer Vision, 2017, 9 pages.
Zellers et al., Neural Motifs: Scene Graph Parsing with Global Context, Conference on Computer Vision and Pattern Recognition, 2018, 10 pages.
Zhu et al., Aligning Books and Movies: Towards Story-Like Visual Explanations by Watching Movies and Reading Books, 2015 Institute of Electrical and Electronics Engineers International Conference on Computer Vision, 2015, pp. 19-27.

* cited by examiner

900

SELF-SUPERVISED VISUAL-RELATIONSHIP PROBING

TECHNICAL FIELD

This disclosure generally relates to methods that generate visual relationship graphs that identify relationships between objects depicted in an image. More specifically, but not by way of limitation, this disclosure relates to using visual-relationship probes to generate graph structures that identify dependencies between the data objects depicted in the image.

BACKGROUND

Visual relationship models that describe object relationships in images have become increasingly important for high-level computer vision (CV) tasks that need complex reasoning. The visual relationship models are often organized in a structured graph representation called a scene graph, where nodes represent objects and edges represent relationships between objects. Recently, there have been significant progress with applying such scene graphs to various CV reasoning tasks such as image captioning, image retrieval, and visual reasoning.

Despite the progress, current visual relationship models still rely on manually-annotated relationship labels. As the number of objects represented by the visual relationship models increase, the number of relationships between the objects become even greater. It is thus difficult to collect enough manual annotations to sufficiently represent important but less frequently observed relationships. Consequently, current visual relationship models tend to focus on modeling only a few relationships being derived from a large number of manual annotations. Although conventional techniques have attempted to use external knowledge databases to help enrich visual relationships, the total number of relationships remain relatively low.

Self-supervised natural language processing (NLP) systems have been used to build contextualized language models of text corpuses without manual intervention. The removal of human annotators from the training phase has enabled training on large unlabeled datasets and led to significant advances in NLP performance. These self-supervised algorithms have also brought advances in vision-language (VL) pre-training tasks. Existing VL techniques concatenate visual objects and the corresponding sentences as one input and apply a transformer module to learn contextualized multi-modal representations in a self-supervised manner. The existing VL techniques, however, rely heavily on the multi-head attention layers or attention distributions to identify implicit relations between objects. Each of the multi-head attention layers may have a distinct behavior without providing much context on how a particular object relates to another object. It is thus challenging to generate a visual relationship model based on the multi-head attention layers. In some instances, existing VL techniques generate an inaccurate visual relationship model due to difficulties in identifying implicit relationships between objects.

BRIEF SUMMARY OF THE INVENTION

Certain embodiments involve using visual-relationship probes to generate graph structures that identify dependencies between the data objects depicted in the image. For example, a vision-language modeling application identifies an inter-modality representation derived from a data object of a plurality of multimodal data objects, in which the data object represents a region depicted in an image or a token characterizing at least part of the image. The visual-language modeling application generates a graph structure of the data object by processing the inter-modality representation. The graph structure identifies one or more dependencies of the data object to other multimodal data objects, in which the one or more dependencies were used to derive the inter-modality representation.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
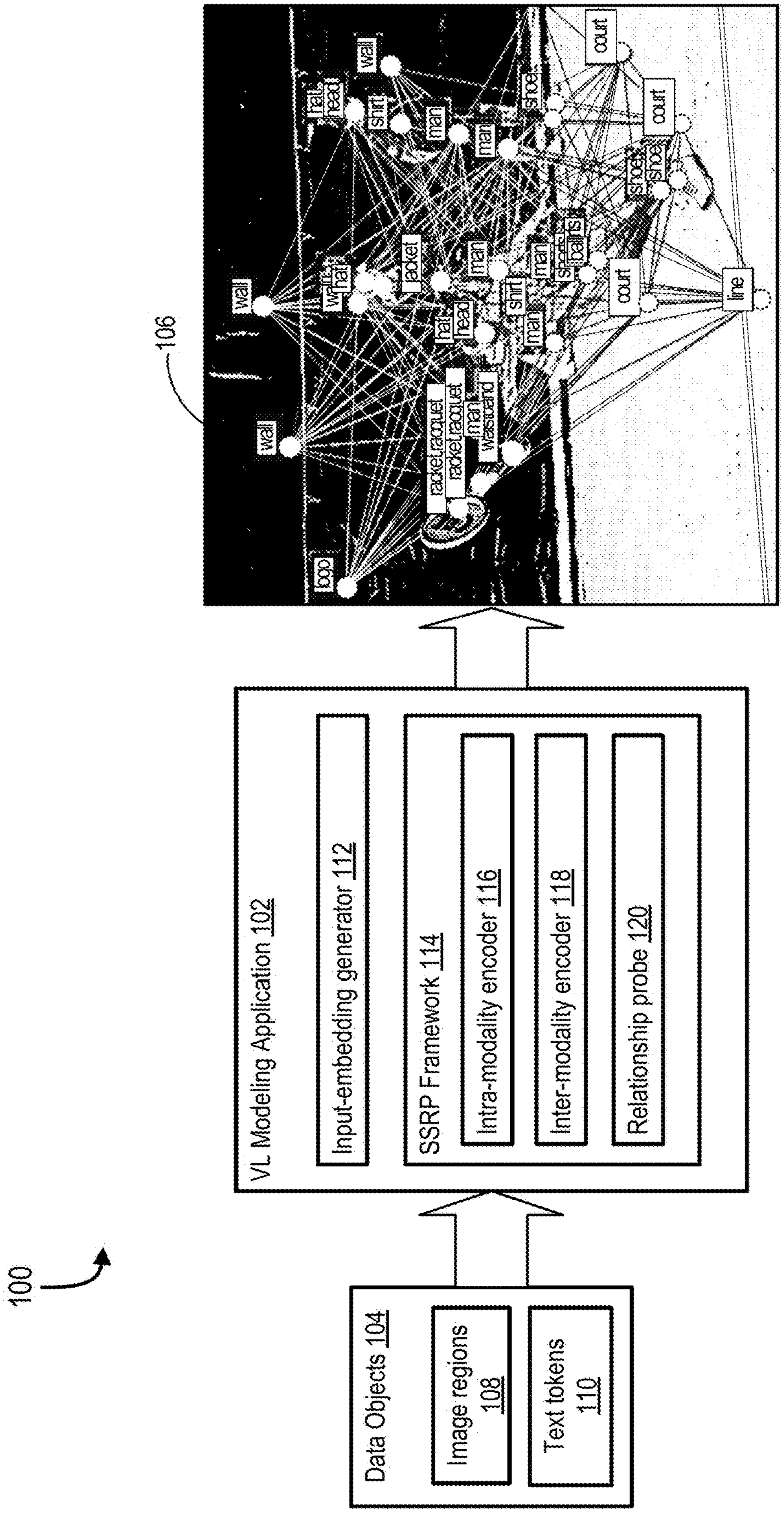
FIG. 1 illustrates a computing environment for self-supervised visual-relationship probing in accordance with some embodiments.

Certain embodiments described herein can address one or more of the problems identified above by generating graph structures (e.g., visual relationship models) that accurately identify relationships between data objects (e.g., regions of an image). The visual relationship models are then used to perform various vision-and-language tasks, such as image retrieval, visual reasoning, and image captioning.

In an illustrative example, a vision-language (VL) modeling application defines a set of regions in an image. For instance, if the image depicts three different objects (e.g., a container, a piece of hot dog, and a glass of water), the VL modeling application defines three regions, such that each region represents one of the objects depicted in the image. For each region, the VL modeling application generates an input embedding representative of the region. The input embedding identifies one or more visual characteristics of the region and a position of the region within the image. In the current example, an input embedding of a region representing the hot dog includes identifies a size or shape of the hot dog (e.g., a token embedding) and that the hot dog is located within the container (e.g., a position embedding). In some instances, the input embedding of the region includes an identifier usable to distinguish the region from other regions of the image (e.g., a segment embedding).

Continuing with this example, the VL modeling application applies a first transformer encoder to the input embedding to generate an intra-modality representation of the region. The intra-modality representation identifies an image object depicted in the region, in which the image object can be identified based on the first transformer encoder processing one or more other regions of the set of regions. A Bidirectional Encoder Representations from Transformers (BERT) encoder receives the input embedding of the region and identifies the image object depicted in the region (e.g., a bread) based on how the image object is associated with image objects depicted in other regions of the image (e.g., toppings, a napkin).

In this example, the VL modeling application applies a second transformer encoder to the intra-modality representation of the region to generate an inter-modality representation of the region. The inter-modality representation identifies that the region corresponds to one or more tokens that describe the image object depicted in the region. The tokens are derived from processing a natural-language text sequence. In the above example, the text sequence is an image caption that states “A container with a hot dog next to a tall glass of water.” The second transformer encoder generates the inter-modality representation of the region depicting the bread and identifies that the image object depicted in the region corresponds to the tokens “hot” and “dog.” By associating the image with the caption text, the VL modeling application may generate the graph structure that accurately identify regions of the image (“hot dog”), in contrast to processing image alone (“bread”).

The VL modeling application generates a graph structure that represents one or more dependencies between the region and the one or more other regions in the image. The graph structure is generated by processing the inter-modality representation of the region. In some instances, the dependencies indicate that the inter-modality representation of the region was derived in part by processing the one or more other regions. Continuing with the above example, the graph structure indicates that the inter-modality representation of the region was identified as “hot dog” based on a first dependency with a second image region identified as “topping” and a second dependency with a third image region identified as “tray.”

In some embodiments, a computer system uses the graph structure to perform various VL tasks. By identifying these dependencies that were used to identify the inter-modality representation, the graph structure can accurately convey information and improve performance of subsequent vision-and-language tasks (e.g., image retrieval, image captioning, visual reasoning). For example, a search engine provides a user interface for retrieving images with a query image as input. In addition to the query image, the search engine takes the graph structure an additional input. Specifically, the search engine provides the query image to the VL modeling application, at which the VL modeling application processes the query image to generate the graph structure. The VL modeling application transmits the generated graph structure back to the search engine. The search engine then utilizes spatial relationships and dependencies between image objects of the query image for image-based search, thereby retrieving images having similar spatial relationships. The results generated by using the graph structure retrieve more accurate images based on a query image, as compared to results generated by existing image-retrieval techniques using the same query image as input.

Certain embodiments described herein thus improve vision-language systems by using self-supervised techniques to identify explicit dependencies in visual objects or textual entities. The generation of such graph structure addresses issues with existing vision-language systems, which suffer from inefficiency (e.g., manual labeling), insufficient information (e.g., lack of relationship data), and heavily-constrained input (e.g., input requires a combination of image and text). By leveraging different aspects of transformer encoders, including masked language modeling and contrastive learning, image objects can be accurately identified while visual relationships between different objects can be discovered. The discovered relationships provide valuable information for performing subsequent vision-language tasks with high accuracy.

Various types of VL tasks can improve by leveraging implicit relationships obtained with the SSRP framework, thereby improving their performance. By performing image retrieval operations using the implicit visual relationships identified using the SSRP framework, image-based search engines can provide higher-quality results that takes into account the visual relationships contained in query images to users. As a result, an effective visual search is performed, thereby assisting users find their desired images. With respect to image captioning, more accurate and robust descriptions of images can be obtained with the implicit visual relationships generated by the VL modeling application. This can help blind (through text-to-speech conversion) or visually-impaired users to ‘see’ their surrounding environments better.

Further, certain embodiments described herein improve existing visual relationship or vision-language modeling by implementing an unsupervised or semi-supervised approach to model visual relationships between regions of the image. This is different from existing visual relationship models that heavily rely on fully-supervised, human-annotated labels. This addresses a common problem in existing techniques: manually annotating visual relationships is a highly subjective process in which different human annotators may annotate image objects with different information. Thus, the self-supervised technique described herein removes subjectivity and discovers implicit relations between data objects without requiring any annotations or labels.

Finally, certain embodiments described herein improve existing pretraining models that require vast amount of datasets for self-supervised training. In contrast, the transformer encoders and the relationship probe are configured specifically to train effectively with augmented data that can be quickly generated and easily integrated into the self-supervision objectives.

Definitions

"Modality" refers to a certain type of information and/or the representation format in which information is stored. In some instances, modality includes audio type, text type, image type, tactile type, and other sensory data (e.g., smell, taste) types, each of which characterizing a particular data object.

"Intra-modality encoding" refers to a transformer-encoding process that transforms an input embedding to a contextual representation (e.g., an intra-modality representation) based on a relationship between a data object of a given modality and other data objects associated with the same modality. For example, the intra-modality encoding generates the intra-modality representation of a text token, based on its definition and position with respect to other text tokens in an input text sequence (e.g., a caption).

"Inter-modality encoding" refers to a transformer-encoding process that transforms a first contextual representation (e.g., intra-modality representation) to another contextual representation (e.g., an inter-modality representation) based on a relationship between a data object of a given modality and data objects associated with different modalities. For example, the inter-modality encoding generates the inter-modality representation of a text token, based on a relationship between the text token and one or more regions of an image associated with the input text sequence.

"Transformer encoder" refers to a machine-learning model that transforms a given sequence of elements, such as the sequence of words in a sentence, into another sequence. The transformer encoders involve semi-supervised learning including unsupervised pretraining followed by supervised fine-tuning. Pretraining is performed on a much larger dataset than fine-tuning.

"Relationship probing" refers to a visual and textual probing process that identifies relationships between image objects in an image or tokens in text data. In particular, the relationship probing uses the inter-modality representations to generate a graph structure (e.g., a latent relationship graph) that indicate relationships between the data objects within the same modality. In some instances, the relationships can be depicted as a node-edge graph structure, which can be overlaid on an input image. The graph structure can also be used as input for various vision-language tasks, such as image captioning, visual reasoning, and image retrieval.

"Data Augmentation" refers to a regularization technique that is used to avoid overfitting when training Machine Learning models. Data augmentation artificially boosts the range and number of training examples (e.g., training images) by transforming existing examples to create additional examples. For example, data augmentation is used to rotate, stretch, and reflect each training image to produce many variants, possibly yielding enough labeled data to improve training of a particular machine-learning model.

"Contrastive learning" refers to a technique for identifying similar and dissimilar objects (e.g., images) for a machine-learning model. For example, a machine learning model is trained to classify between similar and dissimilar images. In some instances, the contrastive learning is performed by learning generic representations of images on an unlabeled dataset, and then the machine-learning model can be fine-tuned with a small amount of labeled images to achieve good performance for a given classification task. The generic representations for the machine-learning model are learned by simultaneously maximizing agreement between differently transformed views of the same image and minimizing agreement between transformed views of different images.

Overall Environment for Self-Supervised Visual-Relationship Probing

FIG. 1 illustrates an example of a computing environment 100 for self-supervised visual-relationship probing in accordance with some embodiments. The computing environment 100 includes a vision-language (VL) modeling application 102. The VL modeling application 102 processes one or more data objects 104 to generate a graph structure 106 that identifies dependencies between the image regions depicted in the input image. The data objects 104 include image regions 108 and text tokens 110. The image regions 108 are identified by an image-processing application applying a convolutional neural network (e.g., a Faster-RCNN) to an input image. For example, the input image depicts a tennis player attempting to return a tennis serve on a grass tennis court, in which the input image is processed to identify, among others, a first image region depicting a tennis racket and a second image region depicting a shoe. With respect to the text tokens 110, a tokenizer application (e.g., a WordPiece tokenizer) splits a text sequence. Continuing with this example, the text sequence "a man reaches out to try to hit a tennis ball" is parsed and split to generate the text tokens 110 that include "a", "man", "reaches", "out", "to", "try", "to", "hit", "tennis", and "ball".

The VL modeling application 102 then uses an input-embedding generator 112 to generate an image input embedding for each data object of the data objects 104. With respect to each of the image regions 108, the input-embedding generator 112 encodes one or more visual characteristics of the region and a position of the region within the image. In some instances, the input embedding of the region includes an identifier usable to distinguish the region from other regions of the image (e.g., a segment embedding). For the text tokens 110, the input-embedding generator encodes, for a given token, a definition of the token (e.g., a token embedding) and a position of the token within a text sequence (e.g., a position embedding).

The VL modeling application 104 then applies components of the SSRP framework 114 to process the input embeddings and generate the graph structure 106. The SSRP framework 114 includes an intra-modality encoder 116, an inter-modality encoder 118, and a relationship probe 120. The intra-modality encoder 116 transforms an input embedding to a contextual representation (e.g., an intra-modality representation) based on a relationship between a data object of a given modality and other data objects associated with the same modality. The intra-modality representation is used to predict an identity of its corresponding data object. For example, the intra-modality encoding generates the intra-modality representation of an image region, based on an image object depicted in the image region 108 as well as a relation of the image region relative to other image regions of the image regions 108.

The inter-modality encoder 118 a first contextual representation (e.g., intra-modality representation) to another contextual representation (e.g., an inter-modality representation) based on a relationship between a data object of a given modality and data objects associated with different modalities. For example, the inter-modality encoding generates the inter-modality representation of an image region 108, based on its associations with the text tokens 110. Similar to the intra-modality representation, the inter-modality representation is used to predict an identity of its corresponding data object, but the predicted identity of the inter-modality representation is more accurate than that of the intra-modality representation.

The relationship probe 120 identifies relationships between data objects 104 by processing the inter-modality representations to generate the graph structure 106 (e.g., a latent relationship graph) that indicates such relationships. In this example, the graph structure 106 depicts as a node-edge graph structure, in which nodes represent the image regions 108 and edges identify dependencies between the image regions 108. For example, a dependency identifies an amount of contribution of each image region towards the classification of an image region as a "tennis racquet". In some instances, the graph structure 106 is overlaid on an input image that includes the image regions 108.

The graph structure 106 can also be used as input for various vision-language tasks, such as image captioning, visual reasoning, and image retrieval. Continuing with the above example, a visual-reasoning application uses the input image and the graph structure 106 to determine that the text sequence "a man reaches out to try to hit a tennis ball" matches the input image over another image depicting a person celebrating a point in a tennis match (not shown).

Overall Process for Self-Supervised Visual-Relationship Probing

Figure 2:
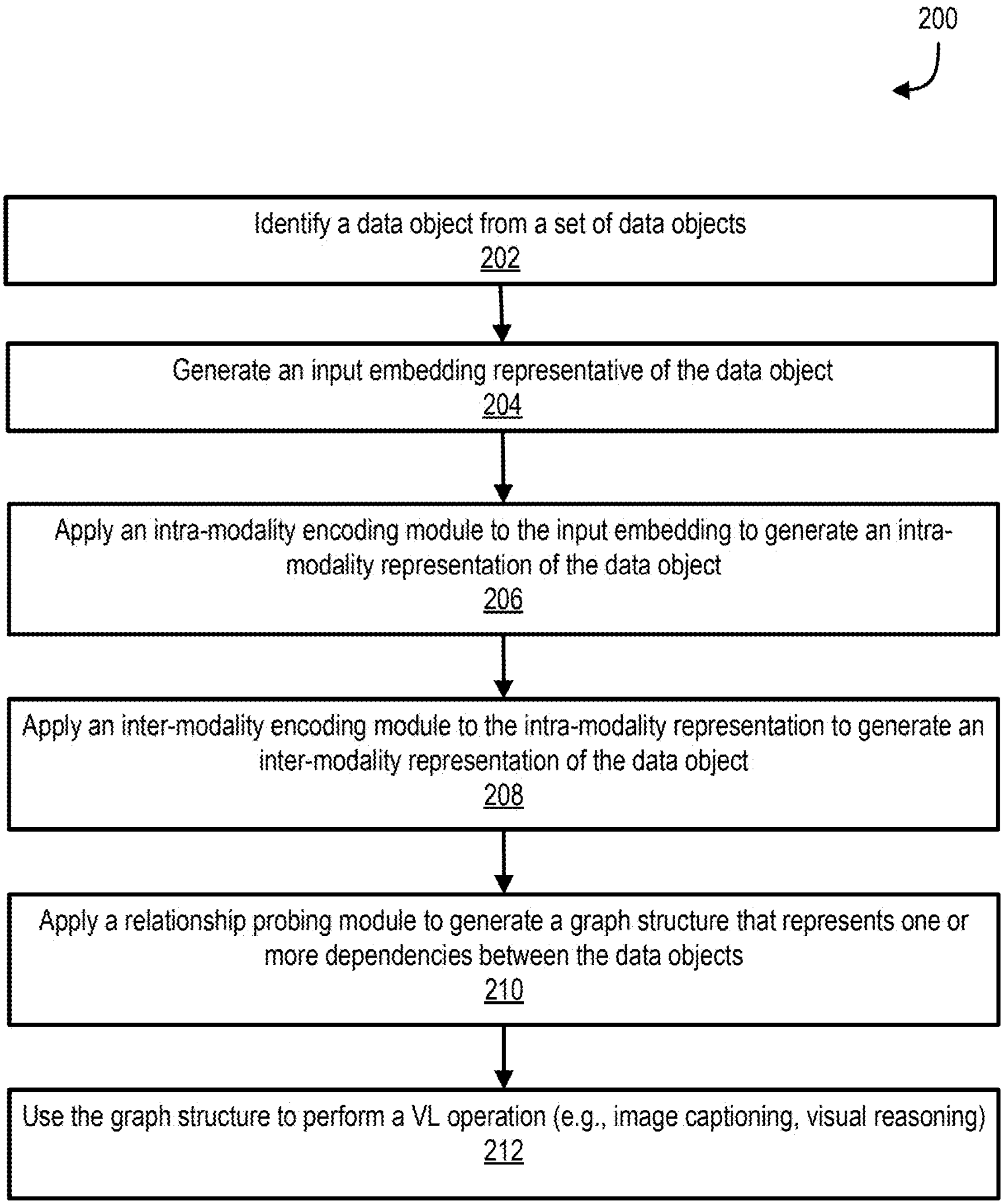
FIG. 2 illustrates a process for self-supervised visual-relationship probing (SSRP) in accordance with some embodiments.

FIG. 2 illustrates a process 200 for self-supervised visual-relationship probing in accordance with some embodiments. For illustrative purposes, the process 200 is described with reference to the components illustrated in FIG. 1, though other implementations are possible. For example, the program code for VL modeling application 102 of FIG. 1, which is stored in a non-transitory computer-readable medium, is executed by one or more processing devices to cause the server system 102 to perform one or more operations described herein.

At step 202, the VL modeling application identifies a data object from a set of data objects. The data object can be a region of an image. In some instances, the data object is a token identified from a text sequence. The data object can be generated by performing data augmentation on an original data object. For example, data augmentation is used to rotate, stretch, and reflect the original data object to derive many variants, including the data object. In some instances, the data augmentation is performed on one or more parts of the input data or the input data as a whole.

At step 204, the VL modeling application generates an input embedding representative of the data object. For example, the input embedding encodes one or more visual characteristics of the region and a position of the region within the image. In some instances, the input embedding of the region includes an identifier usable to distinguish the region from other regions of the image (e.g., a segment embedding). Additionally or alternatively, the input embedding encodes, for a given token, a definition of the token and a position of the token within a text sequence. With respect to generating the input embedding corresponding to a token, the VL modeling application inserts the special tokens [CLS] and [SEP] before and after the text sequence that includes the token, and uses a tokenizer to split the text sequence.

At step 206, the VL modeling application applies an intra-modality encoding module to the input embedding to generate an intra-modality representation of the data object. The intra-modality encoding module transforms the input embedding to the intra-modality representation based on a relationship of the data object with other data objects associated with the same modality. For example, intra-modality encoding generates the intra-modality representation of a text token, based on its position with respect to other text tokens in an input text sequence (e.g., a caption). In another example, the intra-modality representation identifies an image object depicted in the region, in which the image object can be identified based on the first transformer encoder processing one or more other regions of the set of regions. In some instances, A Bidirectional Encoder Representations from Transformers (BERT) encoder receives the input embedding of the region and identifies the image object depicted in the region.

At step 208, the VL modeling application applies an inter-modality encoding module to the intra-modality representation and generates an inter-modality representation of the data object. The inter-modality encoding module transforms the intra-modality representation to an inter-modality representation based on a relationship between the data object and data objects associated with different modalities. For example, the inter-modality encoding generates the inter-modality representation of a text token, based on one or more regions of an image that are associated with the input text sequence of the text token. For example, the inter-modality representation identifies that the region corresponds to one or more tokens that describe the image object depicted in the region. As stated above, the tokens are derived from processing the text sequence.

At step 210, the VL modeling application 102 applies a relationship probing module to generate a graph structure that represents one or more dependencies between the data objects. For example, the graph structure identifies one or more dependencies between a plurality of regions of an image. The dependencies can indicate contribution of image regions towards the classification of a corresponding image region. The graph structure is generated by processing the inter-modality representations of the data objects. In some instances, the relationships can be depicted as a node-edge graph structure, which can be overlaid on an input image. The graph structure can also be used as input for various vision-language tasks, such as image captioning, visual reasoning, and image retrieval.

At step 212, the VL modeling application 102 uses the graph structure to perform a VL operation. The VL operation can be a VL understanding task (e.g., visual reasoning, visual question answer) or a VL generation task (e.g., image captioning). Depending on the type of VL operation, the intra-modality encoding module, the inter-modality encoding module, and the relationship probing module can be further trained using fine-tuning.

Self-Supervised Relationship Probing (SSRP) Framework

Structured representations of images according to visual relationships are beneficial for many vision and vision-language applications. However, current human-annotated visual relationship datasets suffer from the long-tailed predicate distribution problem which limits the potentials of visual relationship models. To increase efficiency of generating visual relationship datasets, a self-supervised technique is needed, such that the self-supervised technique implicitly learns the visual relationships without relying on any ground-truth visual relationship annotations. The VL modeling application improves existing VL techniques by using: 1) intra- and inter-modality encodings to respectively model relationships within each modality separately and jointly; and 2) relationship probing, which seeks to discover dependencies between modalities that are represented in the graph structure. By leveraging masked language modeling, contrastive learning, and dependency tree distances for self-supervision, the VL modeling application can learn object features that contribute to the implicit visual relationships. The graph structure can be used in various VL tasks that benefit from improved visual relationship understanding.

It has been demonstrated that visual relationships between objects can help improve performance on many CV tasks. Existing VL techniques assume a known explicit graph structure, and limit the graph to the most frequently occurring predicate categories while ignoring others that do not have enough labeled examples. Relaxing this assumption, some techniques transfer the object representations learned with predicate functions to rare predicates in few-shot scene graph generation. Other techniques capture the relations via attention mechanisms. However, unlike object detectors that are trained on unambiguous and objectively defined object class labels, visual relationships are subjective and it is difficult to exhaustively annotate all possible relationships between objects. By contrast, the VL modeling application identifies implicit visual relationships between regions of images using the accompanied captions, but without explicitly defined or labeled visual relationship classes (e.g., predicate labels).

In addition, pretraining machine-learning models can be used to solve various VL problems. The pretraining techniques generally employ BERT-like objectives to learn cross-modal representations from visual region features and word embeddings. Self- and cross-attention mechanisms are also used to learn joint representations that are appropriately contextualized in both modalities. Existing VL pretraining techniques heavily rely on massive amounts of visual-linguistic corpus. Moreover, although huge multi-modal training datasets enable pretraining techniques to learn good representations for downstream multi-modal VL tasks, they usually do not benefit visual tasks that only deal with single visual modality during inference. The VL modeling application overcomes this problem by generating implicit visual object relationships even with only visual inputs during inference, while benefiting greatly from the cross-modality learning objectives during training.

In some instances, the VL modeling application utilizes BERT-based network pretraining to learn a rich set of intermediate representations of both semantic and syntactic information and unearth the representations of dependency grammar relations in text (e.g., caption). Additionally or alternatively, the VL modeling application recovers dependency parse trees that have not been encountered during training. As such, the VL modeling application uses BERT to find visual relationships between image regions without explicitly training on relationship annotations.

In some embodiments, the VL modeling application implements a self-supervised relationship probing (SSRP) framework to identify dependencies between objects from the model's representation space. The SSRP framework is implemented with the following assumptions: (1) when images are slightly modified, the relative visual relationships of objects depicted in those images remain unchanged; (2) relationships between objects mentioned in image descriptions are visually observable in the corresponding image. The VL modeling application includes three modules, each consisting of a set of layers. In a first transformer encoding module, implicit intra-modal relationships are modeled using transformer encoders (e.g., a BERT encoder). In a second transformer encoding module, cross-modal learning is performed to identify implicit relationship information across different types of modalities. In the third relationship probing module, a relationship probe network is used to explicitly identify relationships between visual (e.g., image regions) and linguistic entities (e.g., text tokens) are represented explicitly as latent variables. In some instances, the three modules are trained using self-supervision, with a first stage relying on masked language modeling to train the first two modules, and a second stage relying on contrastive learning and linguistic dependency trees as supervisory signals to train the relationship probe network.

The VL modeling application uses the SSRP framework to find dependencies in visual objects or textual entities and to address issues with existing visual relationship models. First, the SSRP framework implements self-supervision rather than explicit supervision. Second, the SSRP framework explicitly models relationships as latent variables. Third, the SSRP framework leverages cross-modal learning but allows a single modality as input at prediction time. Various example experiments were presented to demonstrate that the VL modeling application can benefit both vision and VL understanding tasks.

(a) Types of the SSRP Framework

Figure 3:
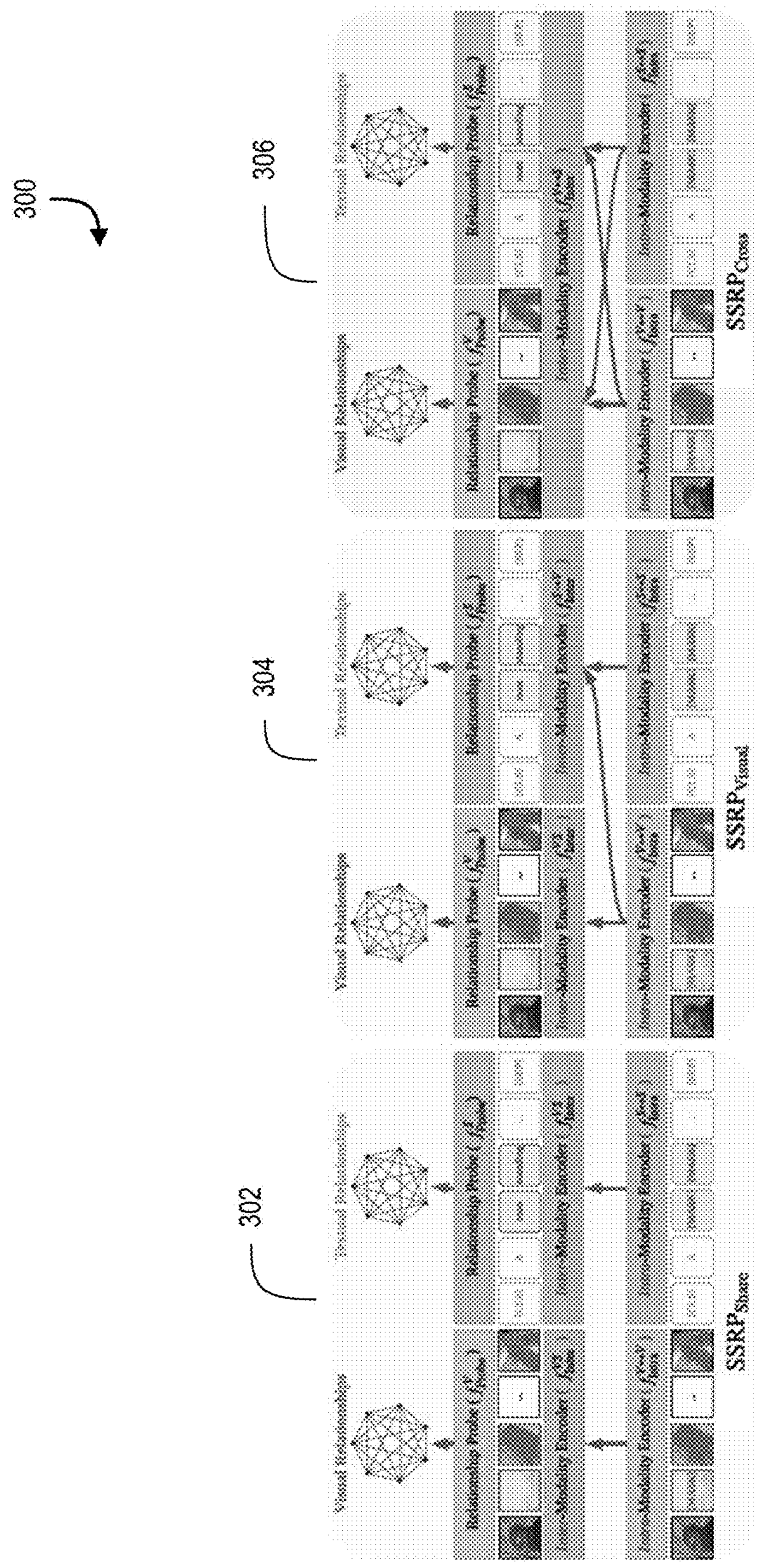
FIG. 3 illustrates an overview of three variants of the SSRP framework $SSRP_{Share}$, $SSRP_{Visual}$, and $SSRP_{Cross}$ in accordance with some embodiments.

FIG. 3 illustrates an overview 300 of three variants of the SSRP framework $SSRP_{Share}$ 302, $SSRP_{Visual}$ 304 and $SSRP_{Cross}$ 306 in accordance with some embodiments. Each of the variants 302, 304, and 306 respectively includes three modules: intra-modality encoder, inter-modality encoder, and relationship probe. The three SSRP variants are different in their respective inter-modality encoding processes. The intra-modality and inter-modality encoders are BERT-like encoders, in which the VL modeling application uses the encoders to respectively capture implicit single-modality relations and cross-modality relations among the entities (image objects and text tokens) and output contextual representations. The VL modeling application uses a relationship probe that generates relationship graphs for each modality from the encoded contextual representations in a self-supervised way.

A difference among the three SSRP variants 302, 304, and 306 lies in the inter-modality encoding process. $SSRP_{Share}$ 302 shares the inter-modality encoder $f_{Inter}^{VS}$ across images and sentences, $SSRP_{Visual}$ 304 adopts an inter-modality encoder $f_{Inter}^{V\rightarrow S}$ in which visual features unidirectionally attend to language features, The notation S->V to indicate textual features attends to visual features for inter-modality encoding. $SSRP_{Cross}$ 306 uses a cross-attention encoder $f_{Inter}^{V\leftrightarrow S}$ in which features of a modality attends to features of another modality and vice versa. In some instances, the three different SSRP variants can be pretrained, fine-tuned and used to support different downstream tasks. Note that, $SSRP_{Cross}$ can be used to support visual-textual multi-modal downstream tasks such as Visual Question Answering (VQA) tasks, while $SSRP_{Share}$ and $SSRP_{visual}$ are used to process multi-modal downstream tasks but also single-modal visual tasks such as image captioning.

FIG. 3 additionally shows a visual-textual alignment prediction for each of the three SSRP variants 302, 304, and 306. In particular, the visual-textual alignment prediction is used to obtain visual-textual alignment representations $f_{align}$ for each of the three SSRP variants. For $SSRP_{Cross}$ 306, the final hidden state of [CLS] is used to predict whether the linguistic sentence is semantically matched with the image.

For $SSRP_{Share}$ 302 and for $SSRP_{Visual}$ 304, since they do not have the bidirectional cross-attention in $SSRP_{Cross}$, $\Sigma_i v_i/N_v$ is used as an additional input to the contextual representation from the transformer encoders and concatenate the additional input with $w_{CLS}$ to generate the visual-textual alignment prediction using $g_{align}(\bullet)$.

(b) Components of the SSRP Frameworks

Input embeddings. The input for the three SSRP pretraining models includes both visual and textual elements, where the former is defined as image regions-of-interest (RoIs) in an image and the latter is defined as the tokens in a caption. Given an image I, the an image-processing application applies a convolutional neural network (e.g., a Faster-RCNN) to an input image to detect RoIs $V=\{v_1, \ldots, v_{N_v}\}$ and configure the feature vector of each RoI as an image input embedding (alternatively referred herein as "visual feature embedding"). In some implementations, the feature vector can be obtained prior to the output layer of each RoI as the visual feature embedding. For text sequence (e.g. a caption) S, a tokenizer application (e.g., a WordPiece tokenizer) inserts the special tokens [CLS] and [SEP] before and after the sentence and splits the text sequence into tokens $W=\{w_1, \ldots, w_{N_w}\}$. In addition to token and visual feature embeddings, the VL modeling application also adds positional encoding to represent the tokens. For a given token $w_i$, its input embedding $w_i$ is the sum of its trainable token embedding, positional embedding (index in the sequence), and segment (image/text) embedding, followed by a layer normalization (LN) layer. In some instances, each image object $v_i$ is represented by its positional feature (normalized top-left and bottom-right coordinates) and its 2048-dimensional RoI feature, both of which are transformed through fully connected (FC) and LN layers to obtain the position-aware object-level embedding $v_1$.

Intra-modality encoding. The VL modeling application uses a first transformer encoder to perform intra-modality encoding, thereby generating a model that identifies the intra-relations of the encoded representations in one modality via self-attention, similar to BERT. Specifically, the VL modeling application randomly masks out $v_{\setminus i}$ and $w_{\setminus j}$ with a fixed probability (e.g. 15%), and feed the masked image input embeddings $\{v_1, \ldots, v_{\setminus i}, \ldots, v_{N_v}\}$ and text input embeddings $\{w_1, \ldots, w_{\setminus j}, \ldots, w_{N_w}\}$ into their respective intra-modality encoders ($f_{Intra}^{V\leftrightarrow V}$ and $f_{Intra}^{S\leftrightarrow S}$) separately. Each layer in the intra-modality encoders contains a self-attention sub-layer and a feedforward (FF) sub-layer. Specific implementations of the first transformer encoder is described in FIGS. 4-6 below.

Inter-modality encoding. The VL modeling application uses a second transformer encoder to perform inter-modality encoding, thereby generating a model that identifies cross-modality relationships between image and textual entities. The three SSRP pretraining models use different inter-modality encoding schemes as illustrated in FIG. 3. In $SSRP_{Share}$, the inter-modality encoding is performed with a single encoder $f_{Inter}^{VS}$ that is shared between the two modalities, and the $f_{Inter}^{VS}$ includes a shared self-attention sub-layer wrapped in residual connection with an LN layer. The shared weights connect the two modalities by causing the projections of the two input modalities to align in the query, key, and value spaces. In $SSRP_{Visual}$, the textual features attend to visual features to connect the two modalities. For example, $SSRP_{Visual}$ includes the Q (query) being generated from textual features, while the K (keys) and V (values) are generated from the visual features. In contrast to $SSRP_{Share}$, $f_{Inter}^{VS}$ is used for the visual branch which includes a self-attention sub-layer and an FF sub-layer, while $f_{Inter}^{S\leftrightarrow V}$ is used for the textual branch which includes a self-attention sub-layer, one unidirectional cross-attention sub-layer, and an FF sub-layer. Finally, $SSRP_{Cross}$ uses an inter-modality bidirectional cross-attention encoder $f_{Inter}^{V\leftrightarrow S}$, where both textual and visual features attend to each other. Each layer in $f_{Inter}^{V\leftrightarrow S}$ consists of two self-attention sub-layers, one bi-directional cross-attention sub-layer, and two FF sub-layers. Similar to above, specific implementations of the second transformer encoder is described in FIGS. 4-6 below.

Relationship probing. The VL modeling application uses relationship probing to model the implicit relationship among visual or textual entities. Specifically, the VL modeling application generates a latent relationship graph $\mathcal{G}_v$ for the objects in an image and a latent relationship graph $\mathcal{G}_x$ for the tokens in a caption. In particular, the latent relationship graph structures are generated based on the unmasked contextual object representations $v_{1:N_v}$ and token representations $w_{1:N_w}$, which are the output feature vectors of the inter-modality encoders. In some instances, the VL modeling application uses a visual probe and a textual probe to compute the distances for each object pair $(v_i, v_j)\in \mathcal{G}_v$ and each token pair $(w_i, w_j)\in \mathcal{G}_W$, respectively. The distance for an object/token pair can be defined as:

$$d_{B_u}(u_i,u_j)^2=(B_u(u_i-u_j))^T(B_u(u_i-u_j))$$

where $u\in\{v, w\}$, i and j are the object/token indices, and $B_u$ are the parameters for the probe layer. As discussed further below, the learning goal of a structural probe is to determine the edge distances between all pairs of nodes, in which the nodes correspond to image regions or tokens of the respective graph structures. The outputs of the visual probe and the textual probe layer are respectively the distance matrices $R^v=(d_{B_v}(v_i,v_j)^2)\in\mathbb{R}^{N_v\times N_v}$ and $R^w=(d_{B_w}(w_i,w_j)^2)\in\mathbb{R}^{N_w\times N_w}$, which capture implicit relations between visual/textual entities.

Transformer Encoders (a) Architecture

A BERT model uses Masked Language Modeling (MLM), a self-supervised pretraining objective that allows a transformer encoder to encode a sequence from both directions simultaneously. Specifically, for an input sequence $S=(w_1, \ldots, w_N)$ of N tokens, BERT first randomly masks out 15% of the tokens and then predicts the masked tokens in the output. The masked tokens in the input sequence are represented by a special symbol [MASK] and fed into a multi-layer transformer encoder. For example, let $H^l=(h_1, \ldots h_N)$ be the encoded features at the l-th transformer layer, with $H^0$ being the input layer. The features at the (l+1)-th layer are obtained by applying a transformer block defined as:

$$H^{l+1}=\mathrm{LN}(\mathrm{LN}(H^l+f_{Self\text{-}Att}{}^l(H^l))+f_{FF}{}^l(\mathrm{LN}(H^l+f_{Self\text{-}Att}{}^l(H^l))))$$

where LN stands for layer normalization, $f_{Self\text{-}Att}{}^l(\bullet)$ is a multi-headed self-attention sub-layer, $f_{FF}(\bullet)$ is a feed-forward sub-layer composed of two fully-connected (FC) layers, wrapped in residual connection with an LN. The token representations in the final layer are used to predict the masked tokens independently.

(b) Implementation

Figure 4:
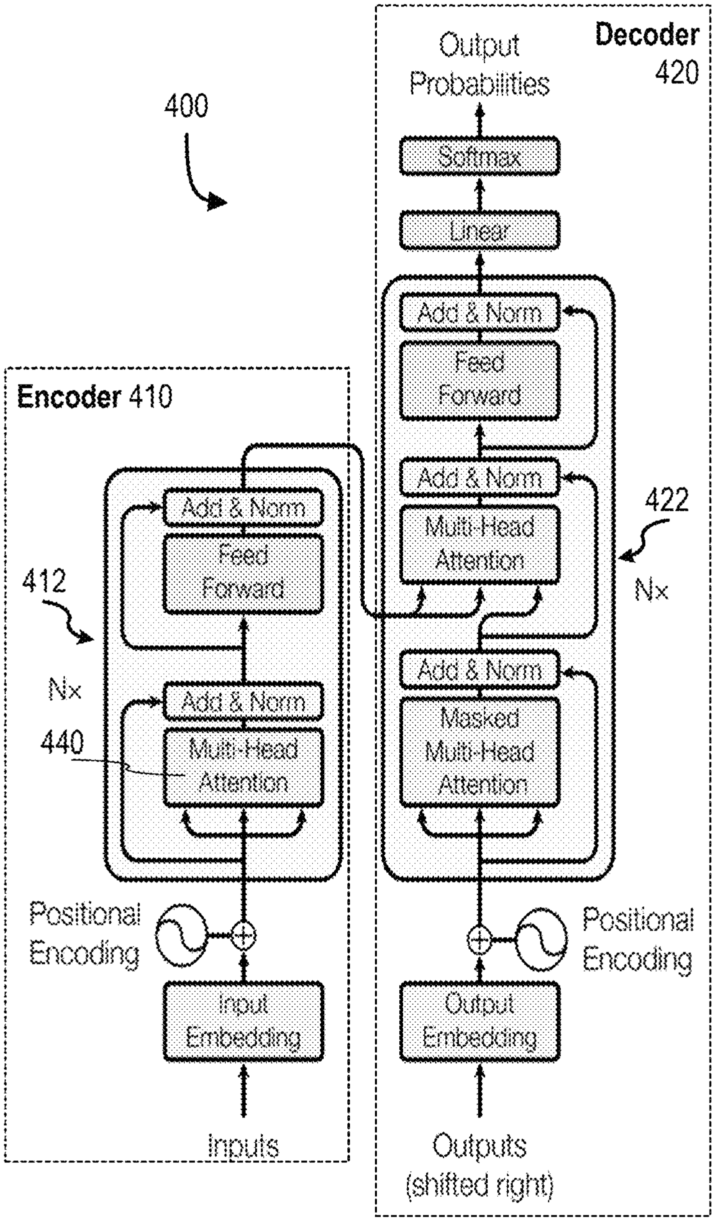
FIG. 4 illustrates an example of a transformer in accordance with some embodiments.

FIG. 4 illustrates an example of a transformer 400 in accordance with some embodiments. Transformer 400 may include an encoder 410 and a decoder 420. Encoder 410 may include a stack of N layers 412. Each layer 412 may include two sub-layers that perform matrix multiplications and element-wise transformations. The first sub-layer may include a multi-head self-attention network, and the second sub-layer may include a position-wise fully connected feed-forward network. A residual connection may be used around each of the two sub-layers, followed by layer normalization. A residual connection adds the input to the output of the sub-layer, and is a way of making training deep networks easier. Layer normalization is a normalization method in deep learning that is similar to batch normalization. The output of each sub-layer may be written as LN(x+Sublayer (x)), where Sublayer(x) is the function implemented by the sub-layer. In the encoder phase, the Transformer first generates initial inputs (e.g., input embedding and position encoding) for each word in the input sentence. For each word, the self-attention aggregates information from all other words (pairwise) in the context of the sentence to create a new representation for each word that is an attended representation of all other words in the sequence. This is repeated for multiple times each word in a sentence to successively build newer representations on top of previous ones.

Decoder 420 may also include a stack of N layers 422. In addition to the two sub-layers in each encoder layer 412 described above, each layer 422 in decoder 420 may include a third sub-layer that performs multi-head attention over the output of the encoder stack. Similar to layers 412 in encoder 410, residual connections around each of the sub-layers may be used in layers 422 in decoder 420, followed by layer normalization. The self-attention sub-layer in the decoder stack may be modified (labeled as "masked multi-head attention") to mask inputs to the decoder from future time steps and prevent positions from attending to subsequent positions. The masking, combined with offsetting the output embeddings by one position, ensures that the predictions for position i can depend only on the known outputs at positions less than i. Decoder 420 may generate one word at a time from left to right. The first word generated at a layer may be based on the final representation of the encoder (offset by 1 position). Every word predicted subsequently may attend to the previously generated words at that layer of the decoder and the final representation of the encoder.

An attention function may map a query and a set of key-value pairs to an output, where the query, keys, values, and output are all vectors. A query vector q encodes the word/position that is paying attention. A key vector k encodes the word to which attention is being paid. The key vector k and the query vector q together determine the attention score between the respective words. The output is computed as a weighted sum of values, where the weight assigned to each value is computed by a compatibility function of the query with the corresponding key.

Figure 5:
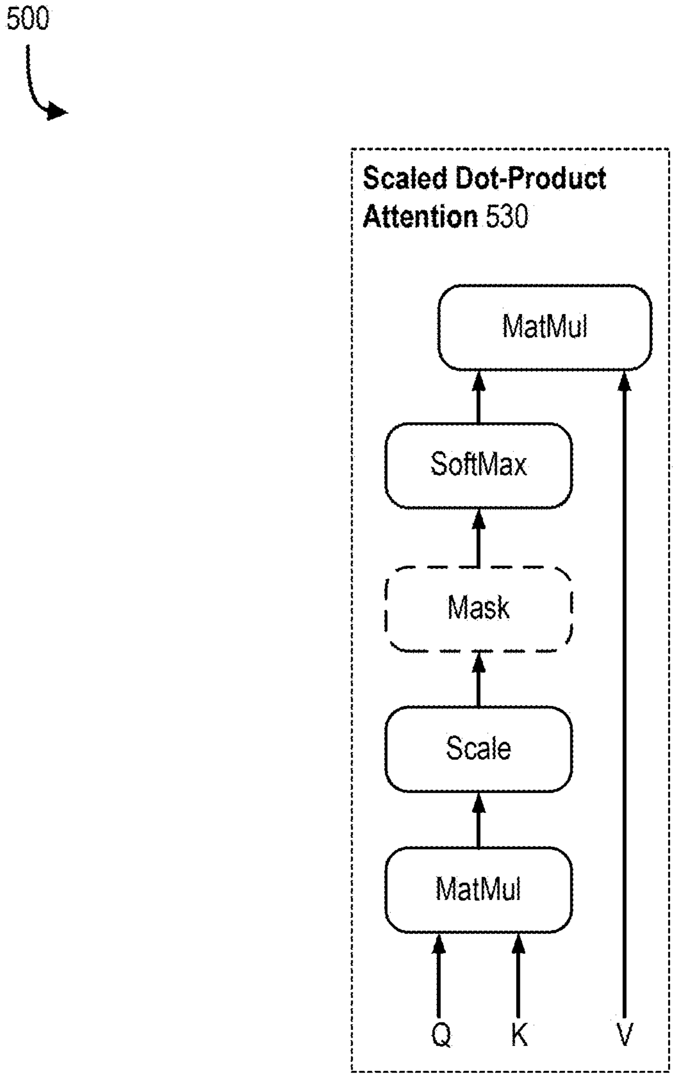
FIG. 5 illustrates an example of a scaled dot-product attention block in a transformer in accordance with some embodiments.

FIG. 5 illustrates an example of a scaled dot-product attention 530 in accordance with some embodiments. The scaled dot-product attention 530 is one of the attention mechanisms that can be used by an encoding layer 412 of the transformer 400. In scaled dot-product attention block 530, the input includes queries and keys both of dimension $d_k$, and values of dimension $d_v$. The scaled dot-product attention may be computed on a set of queries simultaneously, according to the following equation:

$$\text{Attention}(Q, K, V) = \text{softmax}\left(\frac{QK^T}{\sqrt{d_k}}\right)V, \quad (4)$$

where Q is the matrix of queries packed together, and K and V are the matrices of keys and values packed together. The scaled dot-product attention computes the dot-products (attention scores) of the queries with all keys ("MatMul"), divides each element of the dot-products by a scaling factor $\sqrt{d_k}$ ("scale"), applies a softmax function to obtain the weights for the values, and then uses the weights to determine a weighted sum of the values.

When only a single scaled dot-product attention 530 is used to calculate the weighted sum of the values, it can be difficult to capture various different aspects of the input. For instance, in the sentence "I like cats more than dogs," one may want to capture the fact that the sentence compares two entities, while retaining the actual entities being compared. To address this issue, the transformer 400 uses the multi-head self-attention sub-layer to allow the encoder and decoder to see the entire input sequence all at once. To learn diverse representations, the multi-head attention applies different linear transformations to the values, keys, and queries for each attention head, where different weight matrices may be used for the multiple attention heads and the results of the multiple attention heads may be concatenated together.

Figure 6:
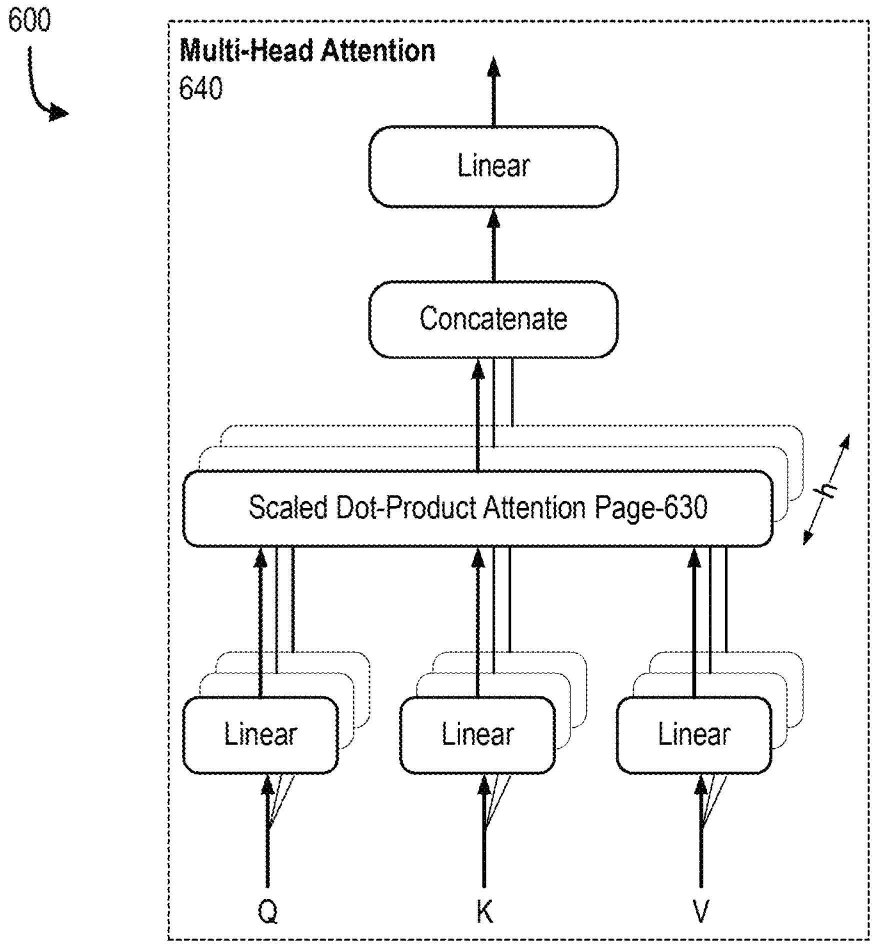
FIG. 6 illustrates an example of a multi-head attention sub-layer used in the encoder and decoder of a transformer in accordance with some embodiments.

FIG. 6 illustrates an example of a multi-head attention sub-layer 640 used in encoder 610 and decoder 620 of transformer 600 described above. The multi-head attention sub-layer 640 includes a multi-head mechanism in which several scaled dot-product attentions 630 (e.g., the scaled dot-product attention 530 of FIG. 5) process input data in parallel. Instead of performing a single attention function with $d_{model}$-dimensional keys, values, and queries, multi-head self-attention sub-layer 640 linearly projects the queries, keys, and values multiple (e.g., h) times with different, learned linear projections to $d_k$, $d_k$, and $d_v$, respectively. Attention functions are performed in parallel on the h projected versions of queries, keys, and values using multiple (e.g., h) scaled dot-product attentions, yielding ($h \times d_v$)-dimensional output values. Each attention head may have a structure as shown in FIG. 5, and may be characterized by three different projections given by weight matrices:

$W_i^K$ with dimensions $d_{model} \times d_k$ $W_i^Q$ with dimensions $d_{model} \times d_k$ $W_i^V$ with dimensions $d_{model} \times d_v$.

The outputs of the multiple scaled dot-product attentions are concatenated, resulting in a matrix of dimensions $d_i \times (h \times d_v)$, where $d_i$ is the length of the input sequence. Afterwards, a linear layer with weight matrix $W^0$ of dimensions $(h \times d_v) \times d_e$ is applied to the concatenation result, leading to a final result of dimensions $d_i \times d_e$:

$$\text{MultiHead}(Q,K,V) = \text{Concat}(\text{head}_1, \ldots, \text{head}_h)W^O$$

$$\text{where head}_i = \text{Attention}(QW_i^Q, KW_i^K, VW_i^V), \quad (5)$$

where $d_e$ is the dimension of the token embedding. Multi-head attention allows a network to jointly attend to information from different representation subspaces at different positions. The multi-head attention may be performed using a tensor operation, which may be split into multiple sub-operations (e.g., one for each head) and performed in parallel by multiple computing engines as described above.

Figure 7:
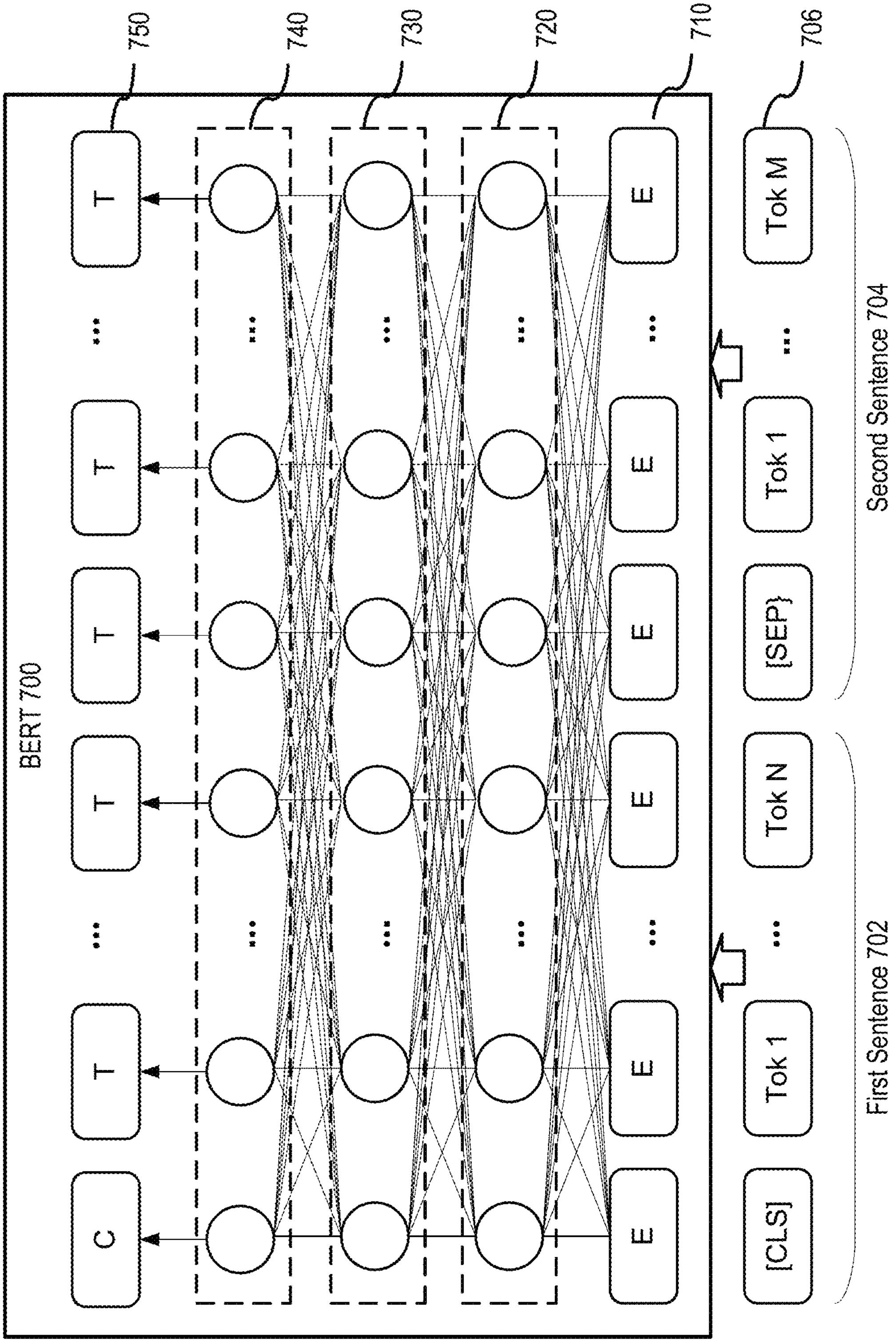
FIG. 7 illustrates an example of a bidirectional encoder representations from Transformers (BERT) model in accordance with some embodiments.

FIG. 7 illustrates an example of a BERT model 700 in accordance with some embodiments. A BERT model may include a multi-layer bidirectional Transformer encoder (rather than a left-to-right Transformer encoder), and does not include the Transformer decoder because the BERT model is used to generate a language model. The BERT model is designed to pre-train deep bidirectional representations from unlabeled text by jointly conditioning on both the left and right context in all layers. The pre-trained BERT model can be fine-tuned with an additional output layer to create state-of-the-art models for a wide range of tasks, such as question answering and language inference, without substantial task-specific architecture modifications. BERT alleviates the unidirectionality constraint by using a MLM pre-training objective. The masked language model randomly masks some of the tokens from the input, and the objective is to predict the original vocabulary identification (Id) of the masked word based only on its context. Unlike the left-to-right language model pre-training, the MLM objective enables the representation to fuse the left and the right context, which allows pre-training a deep bidirectional Transformer. In addition to the masked language model, a "next sentence prediction" task can be used to jointly pre-train text-pair representations.

In the example shown in FIG. 7, BERT model 700 uses inputs that include a sequence of tokens 706, which may include one or more sentences, such as first sentence 702 and second sentence 704. In some embodiments, some (e.g., about 15% of) tokens 706 may be masked. Input tokens 706 may be embedded into vectors 710 and processed by encoder layers 720, 730, . . . , and 740 to generate a sequence of tokens 750 each represented by a vector. Encoder layers 720, 730, . . . , and 740 may form a multi-layer perceptron. Each encoder layer 720, 730, . . . , or 740 may be similar to encoder layers 412 and may include the multi-head attention model and/or fully connected layer as described above with respect to FIGS. 1A-22C. The multi-head attention model may include multiple dot-product attentions. Operations of each encoder layer 720, 730, . . . , or 740 may include a tensor operation that can be split into sub-operations that have no data dependency between each other and thus can be performed by multiple computing engines (e.g., accelerators) in parallel as described above.

Data Augmentation for Pretraining

As indicated above, data augmentation is used to avoid overfitting when training Machine Learning models. Data augmentation artificially boosts the range and number of training examples (e.g., training images) by transforming existing examples to create additional examples. In some instances, data augmentation is used to rotate, stretch, and reflect each training image to produce many variants, possibly yielding enough labeled data to improve training of machine-learning models, including the transformer encoders and the relationship probe used by the VL modeling application.

Figure 8:
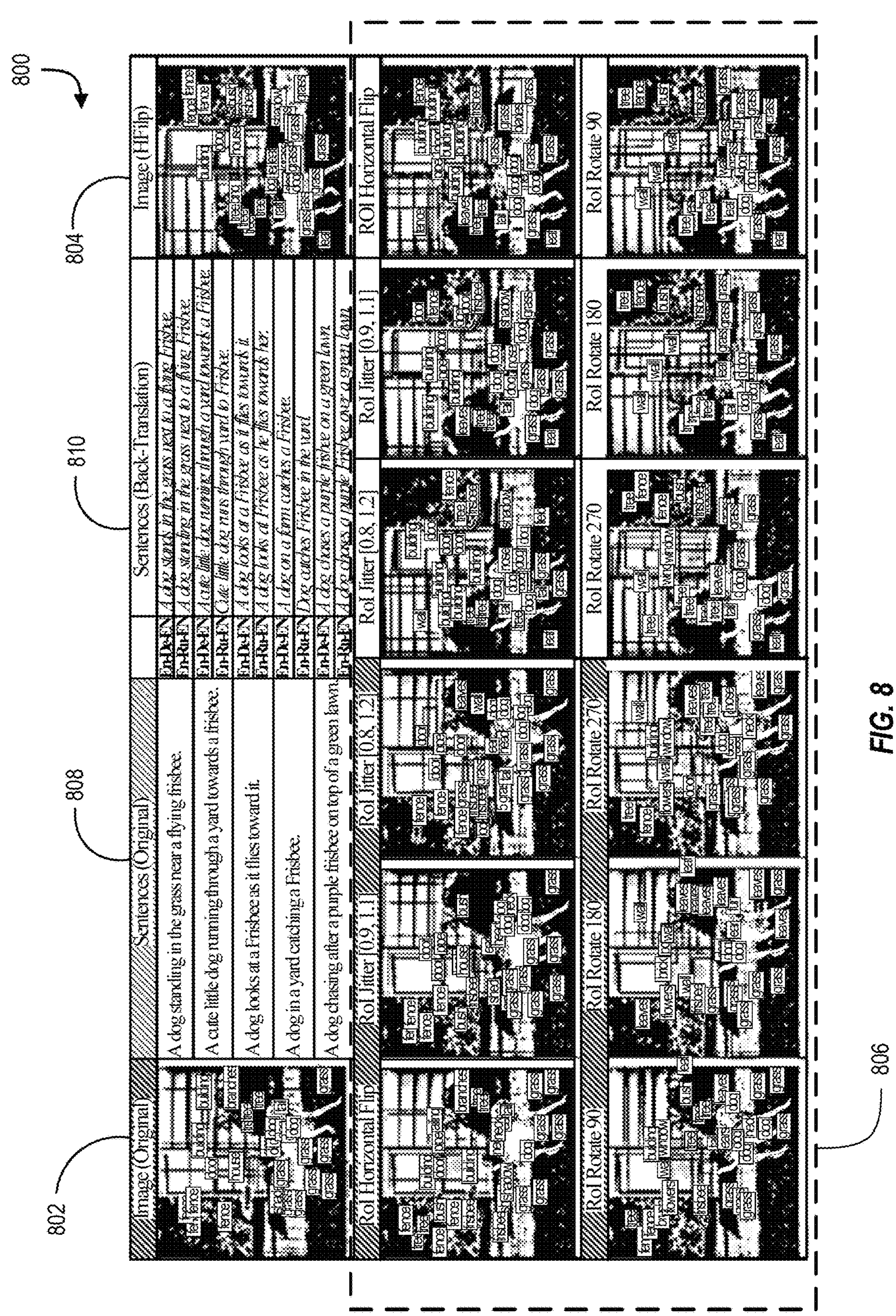
FIG. 8 shows examples of augmented images and captions used for pretraining in accordance with some embodiments.

FIG. 8 shows examples of augmented images and captions 800 used for pretraining in accordance with some embodiments. Image-level augmentation is applied to an input image 802 using a Faster R-CNN (pretrained on the Visual Genome) to generate an augmented image 804. For example, the augmented image 804 is generated by performing a horizontal flip operation on the input image 802. In addition, RoI-level augmentation is applied to the input image 802, such that bounding boxes/RoIs detected by the Faster R-CNN are rotated, reflected, and translated. As a result of the RoI-level augmentation, a set of images with augmented RoIs 806 are generated. For each augmented image, the object labels are shown at the center portions of respective bounding box for a better visualization. Per-category non-maximum suppression is applied to the raw bounding boxes detected by the Faster R-CNN.

The data augmentation is additionally performed on a text sequence 808 that accompanies the input image 802 (e.g., a caption). In this example, the text sequence 808 describes one or more objects depicted in the input image 802, such as "A dog standing in the grass near a flying Frisbee". For such sentence-level type of data augmentation, transformer-based neural machine translation models pretrained on WMT19 can be used to perform back-translation and generate a set of augmented text data 810. Back-translation is referred as a translation of a target document from an original source language (e.g., English) to a target language (e.g., German), and back to the original source language. For ground-truth dependency trees, each sentence is parsed with the dependency parser provided by Stanza.

Pretraining

Figure 9:
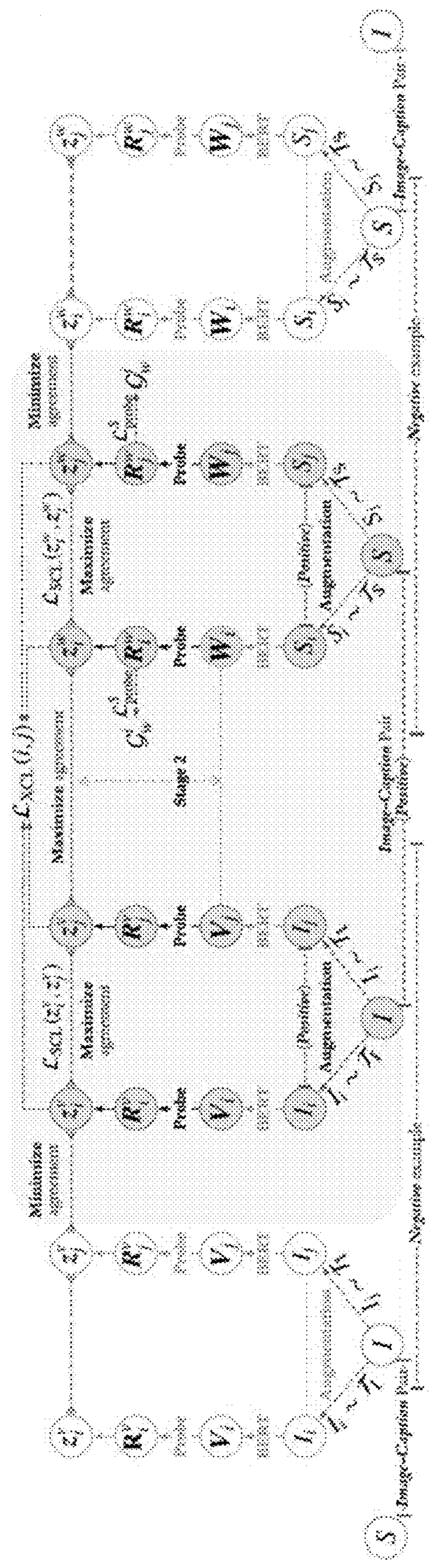
FIG. 9 illustrates a schematic diagram of a learning framework for training the machine-learning models used by the vision-language modeling application in accordance with some embodiments.

To train the transformer encoders and the relationship probe, a training system employ two learning stages. The training system can be a separate system from the VL modeling application, which trains and provides the machine-learning models to be used by the VL modeling application. In the first stage, the training system trains the transformer encoders (e.g., the BERT encoders) including the intra-modality encoders and the inter-modality encoders to obtain the contextual object representations $v_{1:N_v}$ and the token representations $w_{1:N_w}$. In the second stage, with these contextual representations, the training system freezes the BERT encoders and train the two probe layers of the relationship probe to generate implicit relationship matrices $R^v$ and $R^w$. FIG. 9 illustrates a schematic diagram of a learning framework 900 for training the machine-learning models used by the VL modeling application with some embodiments.

(a) Transformer Encoders

Masked language modeling with RoI feature reconstruction. The training system trains transformer encoders, such as the BERT encoders, with the MLM objective to predict masked RoI feature $v_i$ and masked token $w_j$ given their surroundings $I_{\backslash i}$ and $S_{\backslash j}$. In some instances, the training system includes an $L_1$ reconstruction smoothing loss for grounding of visual features. The following loss function is defined:

$$\mathcal{L}_{MLM}=-\mathbb{E}_{S,I\sim\mathcal{D}}[\log p(v_i|I_{\backslash i},\tilde{S})+\log p(w_j|S_{\backslash j},\tilde{I})-\Sigma_i \text{smooth}_{L_1}(v_i-g(v_i|I_{\backslash i},\tilde{S}))]$$

where $\tilde{I}$ and $\tilde{S}$ are the image regions and input worse with random masking, g(•) outputs the unmasked visual feature, $p(v_i|I_{\backslash i},\tilde{S})$ and $p(w_j|S_{\backslash j},\tilde{I})$ are respectively the predicted probabilities for the target object label and word given the masked inputs, and I and S are sampled from the training set $\mathcal{D}$. The symbols v and w were used to represent both the visual features and the label/word for simplicity.

Image-text matching. An additional loss function is added to perform the instance-level alignment between an image and its corresponding text sequence. Both positive (y=1) and negative (y=0) image-sentence pairs are sampled and the model learns to align with a binary cross-entropy loss:

$$\mathcal{L}_{Match}=-\mathbb{E}_{I,S\sim\mathcal{D}}[y\log p(f_{align})+(1-y)\log(1-p(f_{align}))]$$

where $p(f_{align})$ is the output probability of a binary classifier and $f_{align}$ is the visual-textual alignment representation. For $SSRP_{Share}$ and $SSRP_{Visual}$, $f_{align}$ is computed as $g_{align}(\bar{v}[;w_{CLS}])$, where $\bar{v}=\Sigma_i v_i/N_v$ is the visual representation averaged over the contextual features of all the visual elements $v_{1:N_v}$, $w_{CLS}$ is the contextual representation of the special token [CLS], and $g_{align}(\cdot)$ is a non-linear mapping function (see supplementary for details). For $SSRP_{Cross}$, the training system defines $f_{align}=g_{align}(w_{CLS})$. In some instances, the training system configures $w_{CLS}$ to model either the aggregated textual or visual-textual information.

The overall training loss for the first-stage pretraining thus becomes: $\mathcal{L}_{Stage1}=\mathcal{L}_{MLM}+\mathcal{L}_{Match}$.

(b) Relationship Probes

In the second stage, the relationship probe layers are learned via a probe loss $\mathcal{L}_{Probe}^{S}$ and a contrastive loss $\mathcal{L}_{CL-all}$, where the former is to ensure the learned textual relationships $R^w$ is structurally consistent with a dependency tree and the latter is to ensure that the learned relationships $R^v$ and $R^w$ remain stable across different data augmentations.

For text data, the training system uses a pre-parsed dependency tree $\mathcal{G}_w$ for each sentence to guide the textual relationship probe learning with $\mathcal{L}_{Probe}^{S}$, which is defined as:

$$\mathcal{L}_{Probe}^{s} = \frac{1}{N_w^2}\sum_{i,j}|d_{\mathcal{G}_w}(w_i, w_j) - d_{B_w}(w_i, w_j)^2|$$

where $d_{\mathcal{G}_w}(w_i, w_j)$ is the distance between tokens $w_i$ and $w_j$ in the dependency tree $\mathcal{G}_w$.

For the contrastive loss, the training system utilizes stochastic data augmentation techniques to transform an original image (or sentence) into semantics-preserving data samples, and treat them as positive pairs; see FIG. 4, where $I_i \sim \mathcal{T}_I$ and $S_i \sim \mathcal{T}_S$ denote image and sentence augmentations, respectively. In some instances, the training system samples a minibatch of N image-caption pairs and applies two separate augmentation strategies to each modality, resulting in 2N image-caption pairs. For every positive pair, its negative pairs are not sampled explicitly, but instead the training system takes the other 2(N−1) augmented image-caption pairs within a minibatch as negatives. The training system uses contrastive loss functions, in which the single-modality contrastive loss $\mathcal{L}_{SCL}(i, j)$ and cross-modality contrastive loss $\mathcal{L}_{XCL}(i, j)$ for a positive image-caption pair $\langle\{I_i, I_j\}, \{S_i, S_j\}\rangle$ are defined as:

$$\mathcal{L}_{SCL}(i, j) = -\log\frac{e^{z_{i,j}^{v,v}}}{\sum_{k=1}^{2N} 1_{k\neq i} e^{z_{i,k}^{v,v}}} - \log\frac{e^{z_{i,j}^{w,w}}}{\sum_{k=1}^{2N} 1_{k\neq i} e^{z_{i,k}^{w,w}}}$$

$$\mathcal{L}_{XCL}(i, j) = -\sum_{m\in\{i,j\}}\sum_{n\in\{i,j\}}\left(\log\left(\frac{e^{z_{m,n}^{v,w}}}{\sum_{k=1}^{2N} 1_{k\neq m} e^{z_{m,k}^{v,w}}}\right) + \log\left(\frac{e^{z_{m,n}^{w,v}}}{\sum_{k=1}^{2N} 1_{k\neq m} e^{z_{m,k}^{w,v}}}\right)\right)$$

where $1_{[k\neq i]}\in\{0,1\}$ is an indicator function, $z_{i,j}^{x,y}=((z_i^{x})^T z_j^{y})/(\|z_i^x\|\|z_j^y\|))/\tau$ denotes the cosine similarity between $z_i^x$ and $z_j^y$, $z^v$ and $z^w$ are the nonlinear projections of vectorized relationship matrices $R^v$ and $R^w$ projected using MLP projection head, and $\tau$ is a temperature hyper-parameter. The final loss is computed across all positive image-caption pairs in a mini-batch $$\mathcal{L}_{CL-all} = \frac{1}{2N}\sum_{i,j}[\mathcal{L}_{SCL}(i, j) + \mathcal{L}_{SCL}(j, i) + \mathcal{L}_{XCL}(i, j)].$$

Note that $\mathcal{L}_{XCL}$ is invariant to the order of sample indices (i, j) and thus is included just once in $\mathcal{L}_{CL-all}$.

In this stage, the overall training objective is: $\mathcal{L}_{Stage2}=\mathcal{L}_{Probe}^{S}+\mathcal{L}_{CL-all}$.

Fine-Tuning

After the training system trains the machine-learning models including the two transformer encoders and the relationship probe, the training system may fine-tune the above machine-learning models such that the models are configured to perform particular VL tasks. As referred herein, fine-tuning includes performing a secondary optimization to adjust the parameters of the trained transformer encoders and the relationship probe to solve a new set of problems. Fine tuning refers to refitting the weights of a trained unsupervised model to a supervised model.

(a) Visual Reasoning

The transformer encoders and the relationship probe are fine-tuned to solve visual reasoning tasks. Visual reasoning refers to a problem in which the machine-learning model is trained to determine whether a natural language caption is true about a pair of photographs. For example, the transformer encoders and the relationship probe are fine-tuned to solve tasks presented in Natural Language for Visual Reasoning 2 (NLVR2) datasets. The NLVR2 includes two language grounding datasets containing natural language sentences grounded in images. As stated above, visual reasoning requires the machine-learning models to determine whether the natural language statement S is true about an image pair $(I_i, I_j)$.

To fine-tune the machine-learning models, the training system feeds alignment representations of the two images and probed relationships to a binary classifier:

$$p(I_i,I_j,S)=\text{Sigmoid}(f_{FC}(f_{FC+GeLU+LN}([q_i;q_j])))$$

$$q_k=f_{FC+GeLU+LN}([f_{align}^{k};R_k^{v};R_k^{w}]),\ k\in\{i,j\}$$

$$f_{align}^{k},R_k^{v},R_k^{w}=\text{SSRP}(I_k,S)$$

where $f_{align}^{k}$, $R_k^v$, and $R_k^w$ are outputs of SSRP($I_k$, S), Sigmoid is defined as the sigmoid activation function of the binary classifier, and $f_{align}^{i}$ and $f_{align}^{j}$ are the visual-textual alignment representations for $\langle I_i, S\rangle$ and $\langle I_j, S\rangle$, respectively.

For baseline models that do not consider relationships, the predicted probability is calculated as:

$$p(I_i,I_j,S)=\text{Sigmoid}(f_{FC}(f_{FC+GeLU+LN}([f_{align}^{i};f_{align}^{j}])))$$

During fine-tuning, the models are optimized with binary cross-entropy loss functions.

(b) Visual Question Answering

The transformer encoders and the relationship probe are fine-tuned to solve Visual Question Answering (VQA) tasks. VQA refers to a vision-language task that aims to answer questions based on an image. A VQA system takes an image input and a free-form, open-ended, natural-language question about the image and produces a natural-language answer as the output.

VQA requires the trained machine-learning models to answer a natural language question Q related to an image I. For example, the machine-learning models are used to solve problems presented on the VQA v2.0 dataset, which the VQA v2.0 dataset includes open-ended questions about a set of images. The training system thus fine-tunes transformer encoders and the relationship probe on the train split and evaluate it on the test-standard split. Note that VQA is based on the COCO image corpus, but the questions have never been seen by the model during training. During the fine-tuning, we feed the region features and given question into our model, and then output the pooled features that are fed to a classifier for answer prediction:

$$p(I,Q)=\text{Sigmoid}(f_{FC}(f_{FC+GeLU+LN}(q)))$$

$$q=f_{FC+GeLU+LN}([f_{align};R^{v};R^{w}])$$

$$f_{align},R^{v},R^{w}=\text{SSRP}(I,Q)$$

During training, we fine-tune the model using the cross-entropy loss.

(c) Image Captioning

The transformer encoders and the relationship probe are fine-tuned for image captioning tasks. Image captioning refers to the process of generating a textual description from an image by analyzing the objects and actions depicted in the image. For image captioning, the training system fine-tunes only the image branch of $\text{SSRP}_{Visual}$, and Feed the Unmasked Image features into $\text{SSRP}_{Visual}$. In particular, the training system extracts refined contextualized visual representations $v_{1:N_v}$ along with the probed relationships $R^v$. The $R^v$ is treated as the global representation for the image. During fine-tuning, the training system freezes the parameter of $\text{SSRP}_{Visual}$ and only fine-tune the sentence decoder. The training system sets the number of hidden units of each LSTM to 1000, the number of hidden units in the attention layer to 512. In some instances, the training system optimizes the model on one Tesla V100 GPU with cross-entropy loss, an initial learning rate of $5e^{-4}$, a momentum parameter of 0.9, and a batch size of 100 for 40 epochs. After that, the training system further trains the model to optimize it directly for CIDEr score for another 100 epochs. During testing, we adopt beam search with a beam size of 5. The training system can apply the same training and testing settings for Up-Down framework and $\text{SSRP}_{Visual}$ model.

(d) Image Retrieval

For image retrieval, the training system feeds the unmasked image features into $\text{SSRP}_{Visual}$ and obtain the refined contextualized visual representations along with the implicit visual relationships. Image retrieval tasks aim to find similar images to a query image among an image dataset. For example, a search engine may implement the search per image feature to perform the image retrieval task.

Figure 10:
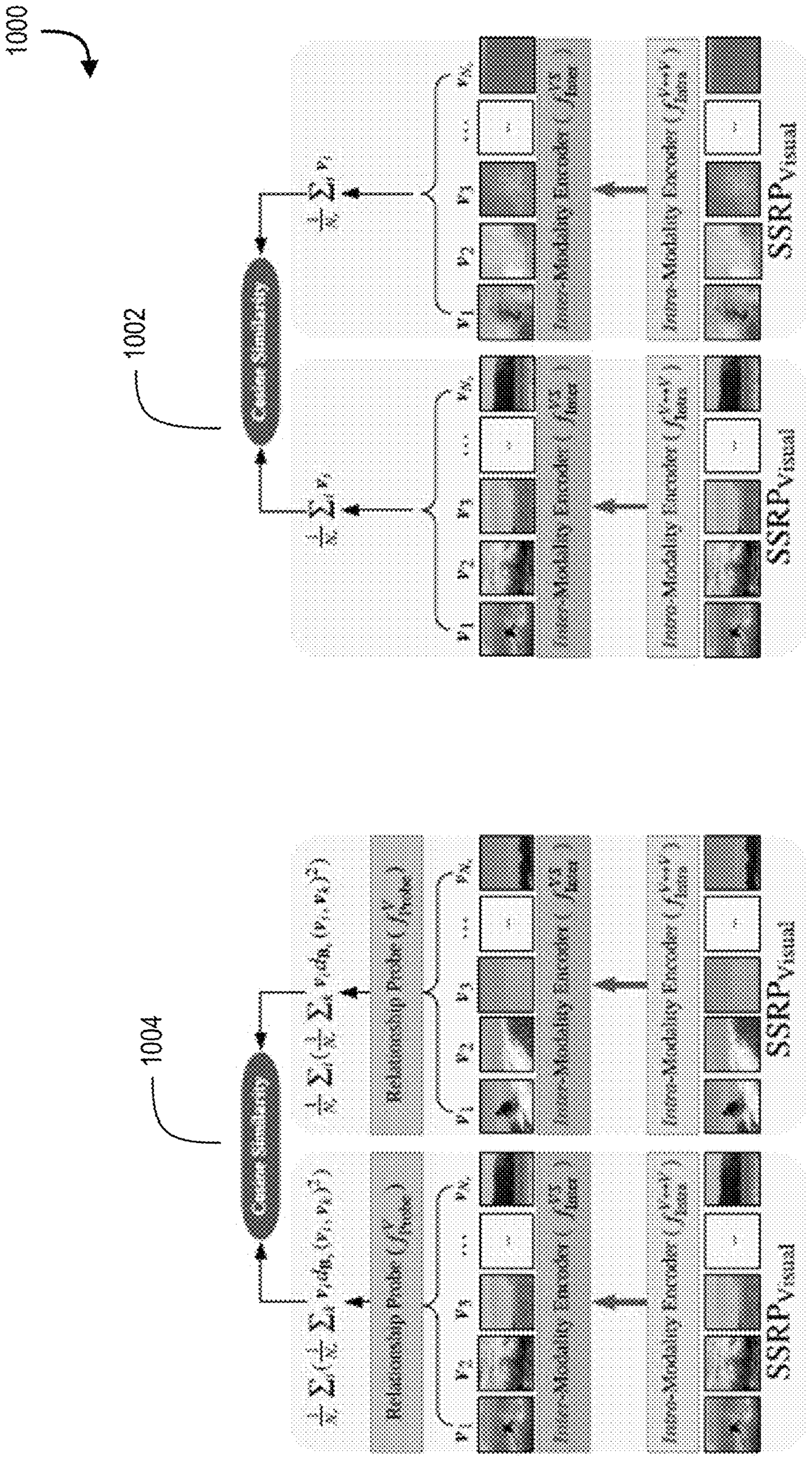
FIG. 10 illustrates exemplary techniques 800 for fine-tuning the machine-learning models for image retrieval in accordance with some embodiments.

FIG. 10 illustrates exemplary techniques 1000 for fine-tuning the machine-learning models for image retrieval in accordance with some embodiments. For example, a first exemplary technique 1002 uses contextualized visual representations $v_{1:N_v}$ for fine-tuning ("Obj. technique"), and a second exemplary technique 1004 uses both contextualized visual representations $v_{1:N_v}$ and implicit visual relationships $R^v$ for fine-tuning ("Obj.+Rel. technique"). For the Obj. technique 1002, the training system averages the contextualized object features with $$\frac{1}{N_v}\sum_i v_i.$$

For the Obj.+Rel. technique 1004, the training system uses the relationship-enhanced visual features obtained with $$\frac{1}{N_v}\sum_i \frac{1}{N_v}\sum_k v_i d_{B_v}(v_i, v_k)^2.$$

Experimental Results (a) Training

Pretraining corpus. To increase the amount of training data, pretraining phase uses combined pretraining datasets such as Conceptual Captions (CC), Stoney Brook University (SBU) captions, Microsoft® Common Objects in Context MSCOCO, VQA dataset, Question Answering on Image Scene Graphs (GQA), Visual Genome (VG), BooksCorpus (BC), and English Wikipedia (EW), etc. For this particular experiment, pretraining data is aggregated from the train (113 k) and validation (5 k) splits of MSCOCO. Specifically, with each MSCOCO image associated with five independent caption annotations, MSCOCO provides an aligned VL dataset of 591K image-and-sentence pairs on 118K distinct images. Table 1 summarizes the corpus used by different pretraining methods.

TABLE 1

Comparisons of the corpus used by different pretraining methods.

| Method | Source | Total | Method | Source | Total |
|---|---|---|---|---|---|
| ViIBERT | CC | 3.1M | LXMERT | MSCOCO, GQA, VQA, VGQA, VG-Cap | 9.2M |
| Unicoder-VL | CC, SBU | 3.8M | VisualBERT | MSCOCO | 0.6M |
| VL-BERT | CC, BC, EW | 3.3M | Ours: SSRP | MSCOCO | 0.6M |

Data augmentation. As an alternative to combining existing VL datasets, the pretraining corpus was expanded via data augmentation on both images and sentences, as shown in Table 2. For data augmentation on images, horizontal flipping (HFlip) was applied at the image level and a few augmentations at the RoI feature level including HFlip, rotations (90°, 180°, and 270°) and bounding box jittering (with scale factors selected from the range of [0.8, 1.2]). With respect to text sequence, the training data was enriched through two pretrained back-translators: English→German→English (En-De-En) and English→Russian→English (En-Ru-En). These augmentation strategies generated significantly more training samples: 1.65M at RoI level and 1.77M at sentence level, while largely preserving the semantic information.

TABLE 2

Number of training samples at image, RoI, and sentence levels.

| | Image | | RoI features of Raw & HFlip images | | | Sentence | | |
|---|---|---|---|---|---|---|---|---|
| 2*Split | Raw | HFlip | HFlip | Rotate(90°, 180°, 270°) | Jitter[0.8, 1.2] | Raw | En-De-En | En-Ru-En |
| Train | 118k | 118k | 118k × 2 | 354k × 2 | 236k × 2 | 591k | 591k | 591k |

Pretraining setting. The three SSRP variants were trained with the augmented training data, as described above. The numbers of layers for the intra-modality encoders of $f_{Intra}^{S\leftrightarrow S}$ and $f_{Intra}^{V\leftrightarrow V}$ were set to 9 and 5, respectively, and the number of layers for the inter-modality encoders of $f_{Inter}^{VS}$, $f_{Inter}^{S\rightarrow V}$, and $f_{Inter}^{V\leftrightarrow S}$ were set to 5. For each transformer block, the hidden size was set to 768 and the number of heads were set to 12. To keep the sizes the same for the relationship matrices, the maximum numbers of words and objects were equally set to 36.

Pretraining was divided into two stages. In stage 1, $\mathcal{L}_{Stage1}$ was used. At each iteration, input words and RoIs were randomly masked with a probability of 0.15. All models are initialized with BERT pretrained weights and the respective pretraining corpus is listed in Table 2. For cross-modality matching, each sentence was replaced with a mismatched one with a probability of 0.5. An Adam optimizer with a linear learning-rate schedule was used with a peak learning rate of 1e−4. The training is implemented with four Tesla V100 GPUs with a batch size of 128 for 10 epochs. After stage 1, the parameters of the intra-modality and inter-modality encoders were frozen, such that the relationship probes was trained with $\mathcal{L}_{Stage2}$. The syntactic dependency tree for each sentence is generated. All variants of SSRP are trained for 30 epochs with Adam, a batch size of 512, and a learning of 5e−5.

Fine-Tuning tasks. The pretrained models were fine-tuned to handle multiple downstream tasks: three VL understanding tasks (NLVR2, VQA, and GQA) and a generation task (image captioning), following the standard fine-tuning settings for downstream tasks. For VL understanding tasks, linearly-fused probed relationships and visual-textual alignment prediction $f_{align}$ were used as features. For image captioning, the Up-Downframework was used and the refined object features learned by $SSRP_{Visual}$ were incorporated. The captioning model is first trained with cross-entropy loss and is then followed by reinforcement learning loss.

(b) Results

The experiment first performed ablation experiments over a few design choices of the present embodiments on NLVR2. The experiment then showed the comparison results on VQA, GQA and image captioning tasks.

TABLE 3

Ablation study on NLVR2. The reported results are accuracy numbers on Dev set.

| | $f_{align}$ (Stage 1) | | $f_{align}$(stage 1) + Rel.(Stage 2) | | |
|---|---|---|---|---|---|
| Method | Raw | Aug. | $R^v$ | $R^w$ | $R^v + R^w$ |
| $SSRP_{Share}$ | 60.53 | 61.67 | 62.52 | 62.66 | 64.25 |
| $SSRP_{Visual}$ | 69.92 | 70.75 | 71.23 | 71.24 | 72.03 |
| $SSRP_{Cross}$ | 74.35 | 74.48 | 74.25 | 74.68 | 75.71 |

Effect of data augmentation. Table 3 shows the ablation study results. For the 'Raw' setting, the experiment pretrained the machine-learning models only on the original corpus, while in the 'Aug.' setting, the experiment augmented the original corpus with the augmentation techniques mentioned in Table 2. It is evident that the data augmentation strategy indeed improves the performance of all three models. Note that data augmentation was used only during pretraining, but not during fine-tuning.

Effect of attention. Comparing the three variants that use different attention settings in Table 3, we observe that $SSRP_{Cross}$ performs the best, and $SSRP_{Visual}$ is better than $SSRP_{Share}$. This confirms the benefits of the cross-attention structures that enable the features of one modality to attend to the other.

TABLE 4

Online VQA/GQA results on the 'test-standard' splits, where '*' indicates the used corpus is larger than VisualBERT and ours.

| | VQA | | | | GQA |
|---|---|---|---|---|---|
| Method | Binary | Number | Other | Accu | Accu |
| BUTD* | 86.6 | 48.6 | 61.5 | 70.3 | — |
| LXMERT* | 88.2 | 54.2 | 63.1 | 72.5 | 60.3 |
| VilBERT* | — | — | — | 70.9 | |
| VL-BERT* | 87.9 | 54.8 | 62.5 | 72.2 | — |
| VisualBERT | 87.5 | 52.3 | 61.0 | 71.0 | — |
| $SSRP_{Cross}$ | 87.8 | 54.4 | 62.7 | 72.2 | 60.0 |

Effect of relationship probing. To analyze the effectiveness of the visual and textual relationships learned via pretraining, the experiment concatenated the visual-textual alignment representation $f_{align}$ and relationships (Rel.) to form a relationship-aware feature vector for answer prediction. As seen from Table 3, using language relationships $R^w$ leads to better results than using visual relationships $R^v$. This is due to the available dependency tree for supervising the language model during training, while the visual relationships are learned in a completely self-supervised way. Combining visual and textual relationships achieves the best results. Based on the results, $SSRP_{Cross}$ (75.71) outperforms LXMERT (74.9) and VisualBERT (67.4) on NLVR2 dev-set, demonstrating that the probed relationships are beneficial for the reasoning task.

Results on VQA& GQA. Table 4 shows the performance of our $SSRP_{Cross}$ on VQA and GQA. The $SSRP_{Cross}$ outperforms VilBERT and VisualBERT, while being highly competitive with the best method that is trained with considerably larger training corpora.

TABLE 5

Results of image captioning on MSCOCO test split and online test server, where B@n, M, C and S are abbreviations for BLEU-n, METEOR, CIDEr, and SPICE, respectively.

| Method | B@1 | B@4 | M | C | S | Method | B@1 | B@4 | M | C | S |
|---|---|---|---|---|---|---|---|---|---|---|---|
| SCST | — | 33.3 | 26.3 | 111.4 | — | Up-Down(Our Impl.) | 81.2 | 36.9 | 28.3 | 120.8 | 21.6 |
| BUTD | 79.8 | 36.3 | 27.7 | 120.1 | 21.4 | $SSRP_{Visual}$ | 82.0 | 38.1 | 28.8 | 126.7 | 22.3 |
| Results on the online MSCOCO test server | | | | | | | | | | | |
| BUTD(c5) | 80.2 | 36.9 | 27.6 | 117.9 | — | $SSRP_{Visual}$ (c5) | 81.5 | 37.5 | 28.3 | 119.8 | — |
| BUTD(c40) | 95.2 | 68.5 | 36.7 | 120.5 | — | $SSRP_{Visual}$ (c40) | 95.3 | 68.6 | 37.2 | 122.4 | — |

Results on image captioning. Unlike the recent VL pretraining methods, which cannot be applied to single-modality vision tasks such as image captioning due to the cross attention used in pretraining, $SSRP_{Share}$ and $SSRP_{Visual}$ models do not have such a limitation. Thus, the experiment applied the stronger model $SSRP_{Visual}$ to image captioning using its refined object features and the learned implicit visual relationships. Table 5 shows the quantitative results, where $SSRP_{Visual}$ outperforms the baselines, indicating that the learned relationship-aware image representations can benefit image captioning. Note that the online results of BUTD are achieved with model ensemble, while we use a single model.

Figure 11:
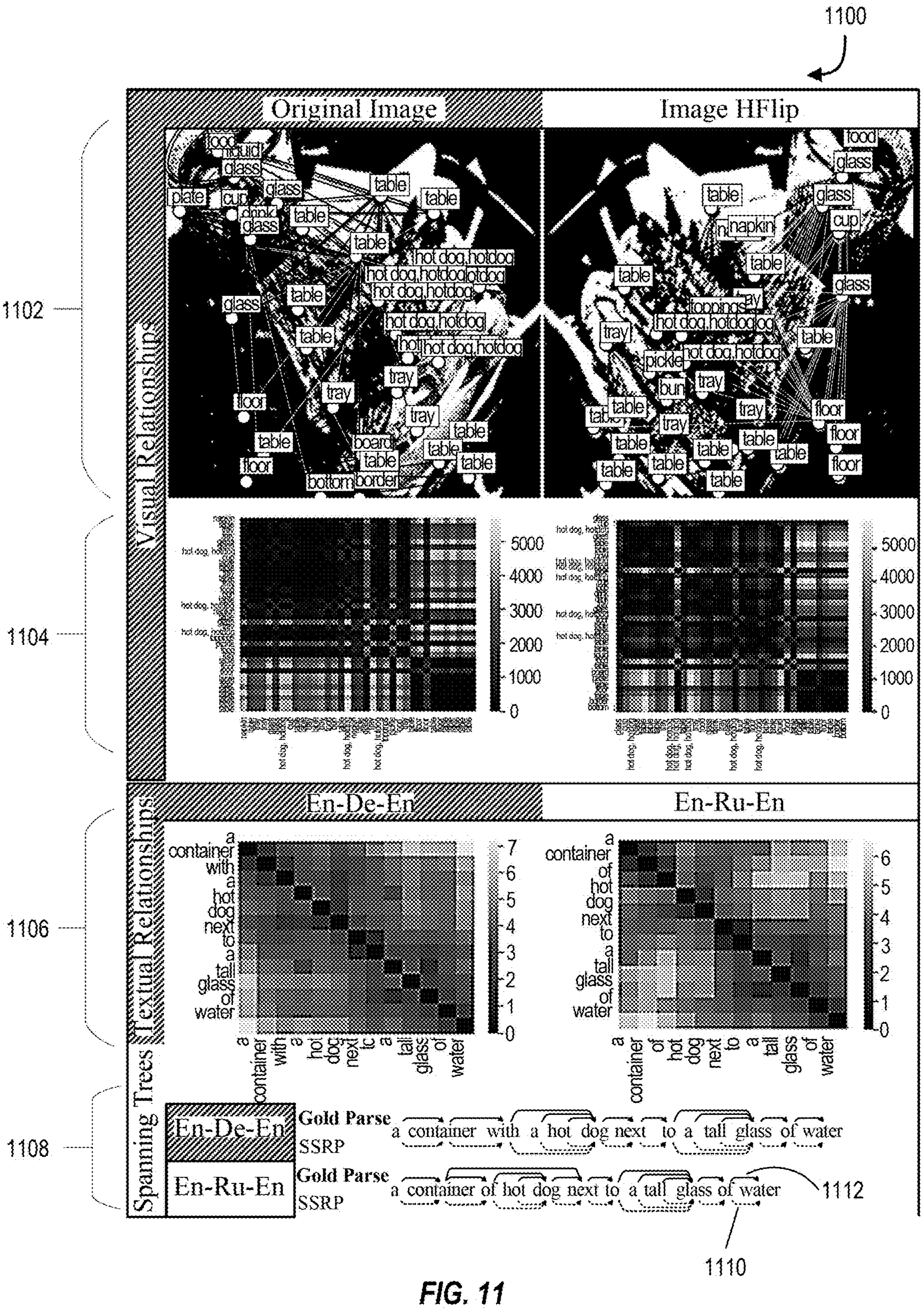
FIG. 11 illustrates the heat-maps of a relationship examples generated by $SSRP_{Cross}$ in accordance with some embodiments.

FIG. 11 illustrates the heat-maps 1100 of a relationship examples generated by $SSRP_{Cross}$ in accordance with some embodiments. The heatmaps 1100 indicate features and their respective correlations that were learned during the training phase. In the heatmaps 1100, a darker color indicates a closer relationship between entities. Particularly, the first row 1102 shows the example images and their augmented counterparts, each of which contains objects and their probed visual relationships represented by straight lines with varying color intensity values. The second row 1104 shows the visual relationship distance graphs for the corresponding images. The third row 1106 shows the distance graphs, and the fourth row 1108 shows dependency trees for augmented captions. FIG. 11 shows that the probed dependency trees 1110 closely resemble the gold dependency trees 1112. In addition, the distance graphs of the original data samples and their augmented counterparts for sentences and images are also close to each other, validating the assumption that the visual/linguistic relationships should be preserved even when data augmentation is applied. The learned implicit relationships between objects are stable across differently augmented images, despite the fact that no gold-standard visual relationships were provided in training.

Figure 12:
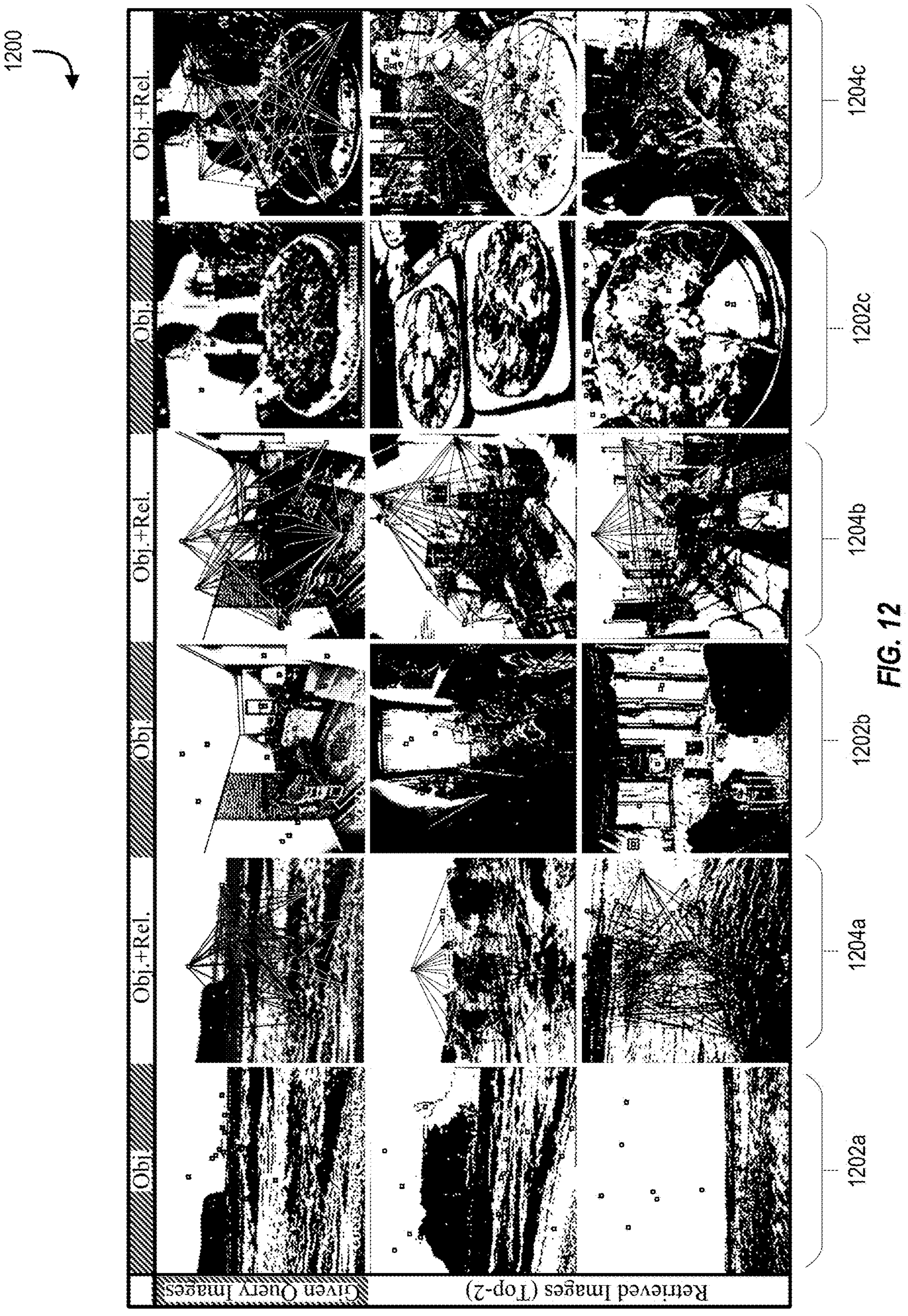
FIG. 12 shows a comparison of top-2 image retrieval results between $SSRP_{Visual}$ with other techniques in accordance with some embodiments.

To further verify the benefits of implicit visual relationships in single-modality visual tasks, the experiment performed image retrieval on MSCOCO with $SSRP_{Visual}$, then compared results of the image retrieval with other techniques. FIG. 12 shows a comparison of top-2 image retrieval results between $SSRP_{Visual}$ with other techniques in accordance with some embodiments. As shown in FIG. 12, each of the 'Obj.+Rel.' (i.e., $SSRP_{Visual}$) models 1204*a*, 1204*b*, and 1204*c* retrieve better visually-matching images that are consistent with the object relationships in query images, as compared to existing techniques 1202*a*, 1202*b*, and 1202*c*. For example, in the third example that shows outputs from the machine-learning model 1204*c*, the person in the top-1 retrieved image is next to a pizza, similar to the original image. This suggests that the $SSRP_{Visual}$ model can capture the complex underlying visual relationships between image regions.

Supplemental Information

The VL modeling application thus uses self-supervised visual relationship probing techniques to implicitly learns visual relationships without training on ground-truth relationship annotations. The VL modeling application transfers the textual relationships from image descriptions to image objects and explores the visual relationships by maximizing the agreement between differently augmented images via contrastive learning. Through relationship probes, it has been demonstrated that relationship structures in images and sentences emerge with the application of well-designed distance and contrastive learning objectives.

Current representation learning models such as BERT and alike follow a similar structure. Probing the implicit knowledge that these models capture about language and vision can be beneficial and particularly advantageous in improving accuracy of downstream tasks such as visual reasoning and image retrieval. Self-supervised relationship probing is a push in that direction and can be used for grounding the relationships expressed in language.

As described above, the VL modeling application uses SSRP, which is a self-supervised relationship probing method for visual and textual relationship extraction. SSRP can be used to enrich the existing scene graph generation methods and to complete the missing relationships between objects. The visual relationships generated by the VL modeling application could be applied to a wide range of vision and vision-language applications including image captioning, image retrieval, object detection, visual question answering, visual reasoning, and visual-textual cross-modal retrieval.

Example of a Computing Environment

Figure 13:
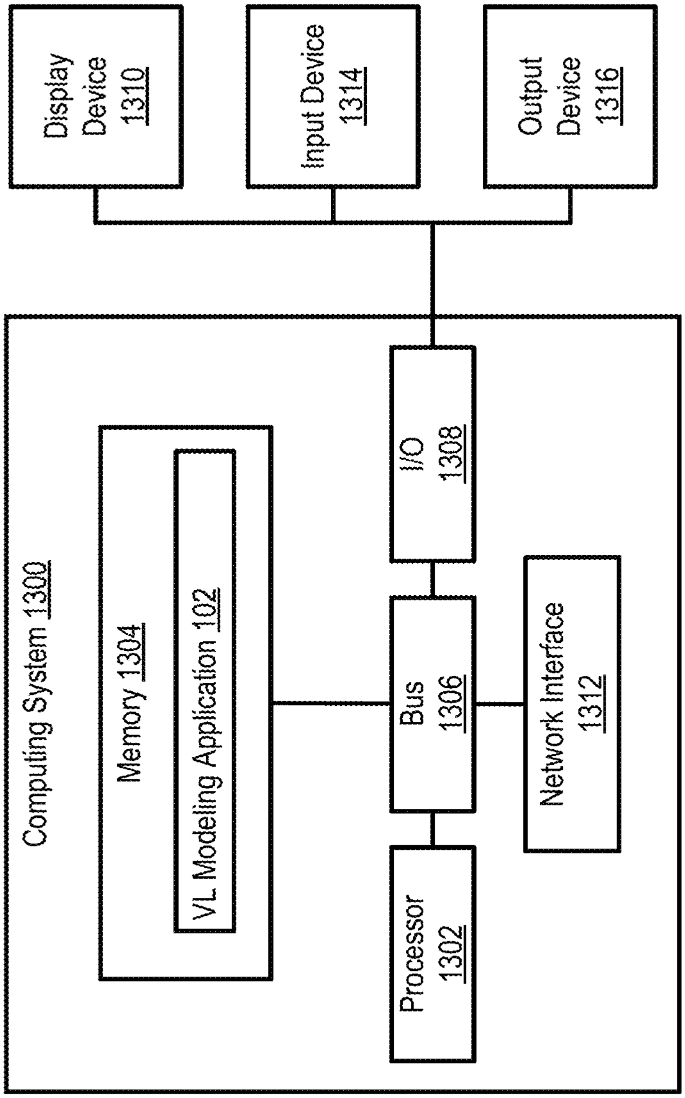
FIG. 13 depicts a computing system that can implement any of the computing systems or environments in accordance with some embodiments.

Any suitable computing system or group of computing systems can be used for performing the operations described herein. For example, FIG. 13 depicts a computing system 1300 that can implement any of the computing systems or environments discussed above. In some embodiments, the computing system 1300 includes a processing device 1302 that executes the VL modeling application 102, a memory that stores various data computed or used by the VL modeling application 102, an input device 1314 (e.g., a mouse, a stylus, a touchpad, a touchscreen, etc.), and an output device 1316 that presents output to a user (e.g., a display device that displays graphical content generated by the VL modeling application 102). For illustrative purposes, FIG. 13 depicts a single computing system on which the VL modeling application 102 is executed, and the input device 1314 and output device 1316 are present. But these applications, datasets, and devices can be stored or included across different computing systems having devices similar to the devices depicted in FIG. 13.

The example of FIG. 13 includes a processing device 1302 communicatively coupled to one or more memory devices 1304. The processing device 1302 executes computer-executable program code stored in a memory device 1304, accesses information stored in the memory device 1304, or both. Examples of the processing device 1302 include a microprocessor, an application-specific integrated circuit ("ASIC"), a field-programmable gate array ("FPGA"), or any other suitable processing device. The processing device 1302 can include any number of processing devices, including a single processing device.

The memory device 1304 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions could include processor-specific instructions generated by a compiler or an interpreter from code written in any suitable computer-programming language, including, for example, C, C++, C#, Visual Basic, Java, Python, Perl, JavaScript, and ActionScript.

The computing system 1300 could also include a number of external or internal devices, such as a display device 1310, or other input or output devices. For example, the computing system 1300 is shown with one or more input/output ("I/O") interfaces 1308. An I/O interface 1308 can receive input from input devices or provide output to output devices. One or more buses 1306 are also included in the computing system 1300. Each bus 1306 communicatively couples one or more components of the computing system 1300 to each other or to an external component.

The computing system 1300 executes program code that configures the processing device 1302 to perform one or more of the operations described herein. The program code includes, for example, code implementing the VL modeling application 102 or other suitable applications that perform one or more operations described herein. The program code can be resident in the memory device 1304 or any suitable computer-readable medium and can be executed by the processing device 1302 or any other suitable processor. In some embodiments, all modules in the VL modeling application 102 are stored in the memory device 1304, as depicted in FIG. 13. In additional or alternative embodiments, one or more of these modules from the VL modeling application 102 are stored in different memory devices of different computing systems.

In some embodiments, the computing system 1300 also includes a network interface device 1312. The network interface device 1312 includes any device or group of devices suitable for establishing a wired or wireless data connection to one or more data networks. Non-limiting examples of the network interface device 1312 include an Ethernet network adapter, a modem, and/or the like. The computing system 1300 is able to communicate with one or more other computing devices (e.g., a computing device that receives inputs for VL modeling application 102 or displays outputs of the VL modeling application 102) via a data network using the network interface device 1312.

An input device 1314 can include any device or group of devices suitable for receiving visual, auditory, or other suitable input that controls or affects the operations of the processing device 1302. Non-limiting examples of the input device 1314 include a touchscreen, stylus, a mouse, a keyboard, a microphone, a separate mobile computing device, etc. An output device 1316 can include any device or group of devices suitable for providing visual, auditory, or other suitable sensory output. Non-limiting examples of the output device 1316 include a touchscreen, a monitor, a separate mobile computing device, etc.

Although FIG. 13 depicts the input device 1314 and the output device 1316 as being local to the computing device that executes the VL modeling application 102, other implementations are possible. For instance, in some embodiments, one or more of the input device 1314 and the output device 1316 include a remote client-computing device that communicates with the computing system 1300 via the network interface device 1312 using one or more data networks described herein.

General Considerations

Numerous specific details are set forth herein to provide a thorough understanding of the claimed subject matter. However, those skilled in the art will understand that the claimed subject matter could be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages could be used to implement the teachings contained herein in software to be used in programming or configuring a computing device.

Embodiments of the methods disclosed herein can be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values could, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, could readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:

receiving an image;

receiving an indication of a vision-language (VL) operation relating to the image, wherein the VL operation includes at least one of a VL understanding task or a VL generation task, generating, by a vision-language modeling application, an input embedding that identifies a visual characteristic of a first region within the image and a position of the first region within the image;

encoding, with a first transformer encoder of the vision-language modeling application, the input embedding into an intra-modality representation of the first region, wherein the intra-modality representation identifies an image object depicted in the first region based on analyzing a second region within the image and the intra-modality representation is a first feature vector;

encoding, with a second transformer encoder of the vision-language modeling application, the intra-modality representation into an inter-modality representation of the first region, wherein the inter-modality representation is a second feature vector based on one or more visual feature vectors representing the image object and one or more textual feature vectors corresponding to a token that describes the image object, wherein the token is included in a plurality of tokens that are derived from a text sequence;

generating, by the vision-language modeling application and from the inter-modality representation, a graph structure that represents a dependency between the first region and the second region, wherein the dependency indicates that the inter-modality representation of the first region was derived, at least in part, by processing the second region and comprising:

computing pairwise distances between the one or more visual feature vectors and the one or more textual feature vectors of the inter-modality representations of the first region, wherein the pairwise distances represent relationships between the visual feature vectors and between the textual feature vectors, respectively; and constructing the graph structure based using the pairwise distances, wherein the relationship between the first region and the second region are based on the pairwise distances;

executing the VL operation using the image and based on the dependency of the graph structure; and outputting a result, comprising information about the image based on an output of the execution of the VL operation.

2. The method of claim 1, wherein the VL operation further comprises at least one of: using the graph structure to identify another image that depicts a second image object that shares the visual characteristic and the position identified by the input embedding of the first region, or using the dependency of the graph structure to determine whether the text sequence characterizes a plurality of image objects depicted in the image.

3. The method of claim 1, wherein the graph structure includes a set of edges connecting the first region and one or more other regions, and wherein a length of an edge of the set of edges identifies a degree of relatedness between the first region and another region to which the edge is connected.

4. The method of claim 1, wherein encoding, with the second transformer encoder of the vision-language modeling application, the intra-modality representation into the inter-modality representation of the first region includes:

executing, by the vision-language modeling application, a shared self-attention sub-layer of the second transformer encoder to process a plurality of regions and generate a first output;

executing, by the vision-language modeling application, the shared self-attention sub-layer to process the plurality of tokens and generate a second output; and generating, by the vision-language modeling application, the inter-modality representation for the first region based on the first output and the second output.

5. The method of claim 4, further comprising:

executing, by the vision-language modeling application, a cross-attention sub-layer of the second transformer encoder to process the plurality of regions with the plurality of tokens and generate a third output; and generating, by the vision-language modeling application, the inter-modality representation for the first region based on the second output and the third output.

6. The method of claim 1, further comprising overlaying the graph structure over the image.

7. The method of claim 1, further comprising generating a heat map that represents the graph structure, wherein the heat map includes a set of heat-map elements, and wherein a color of a particular heat-map element identifies a degree of relatedness between the first region and a region of one or more other regions.

8. A system comprising:

a processor;

an input-embedding module configured to generate an input embedding for a token of a set of tokens, wherein the input embedding encodes a position of the token within a text sequence from which the set of tokens were derived;

a first transformer encoding module configured to encode the input embedding that represents the token into an intra-modality representation of the token, wherein the intra-modality representation identifies a definition of the token based on an analysis of one or more other tokens from the set of tokens and the intra-modality representation is a first feature vector; and a second transformer encoding module configured to encode the intra-modality representation into an inter-modality representation of the token, wherein the inter-modality representation is a second feature vector based on one or more textual feature vectors including the token defining a region of an image depicting an image object and one or more visual feature vectors representing the image object; and a relationship-probing module configured to generate, from the inter-modality representation, a graph structure that represents one or more dependencies between the token and the one or more other tokens by:

computing pairwise distances between the one or more visual feature vectors and between the one or more textual feature vectors of the inter-modality representations, respectively, wherein the pairwise distances represent relationships between the visual feature vectors and the textual feature vectors; and constructing the graph structure based using the pairwise distances, wherein the relationship between the region of the image and other regions of the image are based on the pairwise distances; and a non-transitory computer-readable medium having stored thereon instructions that, when executed by the processor, cause the processor to perform operations including:

receiving the image;

receiving an indication of a vision-language (VL) operation relating to the image, wherein the VL operation includes at least one of a VL understanding task or a VL generation task;

outputting the image to the input-embedding module;

receiving, from the relationship-probing module, the graph structure;

executing the VL operation using the image and based on the dependency of the graph structure; and outputting a result, comprising information about the image based on an output of the execution of the VL operation.

9. The system of claim 8, wherein the instructions further cause the processor to:

generate another graph structure that represents one or more second dependencies between a plurality of regions of the image, wherein the one or more second dependencies between the plurality of regions are derived by processing the set of tokens.

10. The system of claim 8, wherein the graph structure includes a set of edges connecting the token with the one or more other tokens, and wherein a length of an edge of the set of edges identifies a degree of relatedness between the token and another token to which the edge is connected.

11. The system of claim 8, wherein the second transformer encoding module is configured to encode the intra-modality representation into the inter-modality representation of the token by:

applying a shared self-attention sub-layer of the second transformer encoding module to process the set of tokens thereby generating a first output;

applying the shared self-attention sub-layer to process a plurality of regions thereby generating a second output; and generating the inter-modality representation for the region based on the first output and the second output.

12. The system of claim 11, wherein the instructions further cause the processor to:

apply a cross-attention sub-layer of the second transformer encoding module to process the set of tokens with the plurality of regions thereby generating a third output; and generate the inter-modality representation for the token based on the second output and the third output.

13. The system of claim 8, wherein the instructions further cause the processor to:

generate a dependency tree that represents the graph structure; and overlay the dependency tree over the text sequence.

14. The system of claim 8, wherein the instructions further cause the processor to generate a heat map that represents the graph structure, wherein the heat map includes a set of heat-map elements, and wherein a color of a particular heat-map element identifies a degree of relatedness between a corresponding token and a token of the one or more other tokens.

15. A computer program product tangibly embodied in a non-transitory machine-readable storage medium including instructions configured to cause one or more data processors to perform actions including:

receiving an image;

receiving an indication of a vision-language (VL) operation relating to the image, wherein the VL operation includes at least one of a VL understanding task or a VL generation task;

identifying, for each data object of a plurality of multimodal data objects in the image, an intra-modality representation derived from an input embedding that represents the data object, wherein:

the data object of the plurality of multimodal data objects represents:

a region of a plurality of regions depicted in the image; or a token of a plurality of tokens in a text characterizing the plurality of regions; and the intra-modality representation is a first feature vector;

identifying, for each intra-modality representation of a particular data object, an inter-modality representation, the inter-modality representation comprising a second feature vector based on one or more visual feature vectors and one or more textual feature vectors, wherein the visual feature vectors are generated by processing intra-modality representations corresponding to image regions and the textual feature vectors are generated by processing intra-modality representations of tokens that describe the particular data object;

a step for generating a graph structure by processing the inter-modality representations of the plurality of multimodal data objects based on pairwise distances between the one or more visual feature vectors and the one or more textual feature vectors of the inter-modality representation, wherein the pairwise distances represent relationships between the visual feature vectors and between the textual feature vectors, respectively;

executing the VL operation using the image and based on a dependency of the graph structure; and outputting a result, comprising information about the image based on an output of the execution of the VL operation.

16. The computer program product of claim 15, wherein the intra-modality representation is generated by applying a Bidirectional Encoder Representations from Transformers (BERT) model to the data object, wherein the intra-modality representation identifies one or more characteristics of the data object and one or more associations between the data object and other data objects of the plurality of multimodal data objects.

17. The computer program product of claim 15, further comprising instructions configured to cause the one or more data processors to perform actions including:

generating, for each data object of the plurality of multimodal data objects, the input embedding that represents the data object, wherein the input embedding is a third feature vector generated by applying a convolutional neural network to the data object.

18. The computer program product of claim 15, wherein the graph structure is an image-based graph structure that identifies one or more dependencies between the plurality of regions.

19. The computer program product of claim 15, wherein the graph structure is a text-based graph structure that identifies one or more dependencies between each pair of the plurality of tokens.

20. The computer program product of claim 15, further comprising instructions configured to cause the one or more data processors to perform actions including generating a heat map that represents the graph structure, wherein the heat map includes a set of heat-map elements, and wherein a color of a particular heat-map element identifies a degree of relatedness between the data object and another data object of the plurality of multimodal data objects.

* * * * *